(12) United States Patent
Kobayashi et al.

(10) Patent No.: US 6,840,969 B2
(45) Date of Patent: Jan. 11, 2005

(54) HIGH POLYMER ELECTROLYTE FUEL CELL AND ELECTROLYTE FILM-GASKET ASSEMBLY FOR THE FUEL CELL

(75) Inventors: Susumu Kobayashi, Ikoma (JP); Masato Hosaka, Osaka (JP); Kazuhito Hatoh, Osaka (JP); Hikaru Murakami, Saijo (JP); Mikio Takezawa, Kanonji (JP); Takayuki Onishi, Kanonji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 158 days.

(21) Appl. No.: 10/240,311

(22) PCT Filed: Jan. 30, 2002

(86) PCT No.: PCT/JP02/00736
§ 371 (c)(1),
(2), (4) Date: Oct. 1, 2002

(87) PCT Pub. No.: WO02/061869
PCT Pub. Date: Aug. 8, 2002

(65) Prior Publication Data
US 2003/0091885 A1 May 15, 2003

(30) Foreign Application Priority Data
Jan. 31, 2001 (JP) ............................... 2001-24577
Aug. 31, 2001 (JP) ............................... 2001-264095

(51) Int. Cl.$^7$ ............... H01M 6/00; H01M 8/10; H01M 2/08; H01M 2/14

(52) U.S. Cl. ............... 29/623.2; 29/623.4; 29/623.5; 429/32; 429/36; 429/39; 427/115

(58) Field of Search ............... 429/32, 34, 35, 429/36, 37, 38, 39; 29/623.2, 623.4, 623.5; 427/115

(56) References Cited

U.S. PATENT DOCUMENTS 4,753,857 A 6/1988 Hosaka .................. 429/38

FOREIGN PATENT DOCUMENTS

| JP | 62-193065 A | 8/1987 |
|---|---|---|
| JP | 62-243258 A | 10/1987 |
| JP | 62-256380 A | 11/1987 |
| JP | 2-128633 | 10/1990 |
| JP | 5-21077 A | 1/1993 |
| JP | 5-242897 A | 9/1993 |
| JP | 6-13091 A | 1/1994 |
| JP | 6-325777 A | 11/1994 |
| JP | 8-45517 A | 2/1996 |
| JP | 10-172587 A | 6/1998 |
| JP | 2000-21422 A | 1/2000 |
| WO | WO00/64995 | 11/2000 |
| WO | WO 02/37586 A1 | 5/2002 |

Primary Examiner—Patrick Ryan
Assistant Examiner—Thomas H. Parsons
(74) Attorney, Agent, or Firm—McDermott Will & Emery LLP

(57) ABSTRACT

An electrolyte membrane-gasket assembly for a fuel cell, including a polymer electrolyte membrane and a gasket, made of a seal material, covering the peripheral portion of the electrolyte membrane, in which the electrolyte membrane has a sequence of a plurality of through-holes in the peripheral portion, and a portion of the gasket covering one surface of the electrolyte membrane and a portion covering the other surface are connected to each other through the through-holes of the electrolyte membrane. This assembly provides a polymer electrolyte fuel cell free from gas cross leakage caused by a detachment of the gasket from the polymer electrolyte membrane. It is preferable to further include catalyst layers carried on both surfaces of the polymer electrolyte membrane, respectively, and protective films covering, respectively, sections spanning from the peripheral portion of each of the catalyst layers to the peripheral portion of the polymer electrolyte membrane.

31 Claims, 25 Drawing Sheets

FIG. 16
(a) 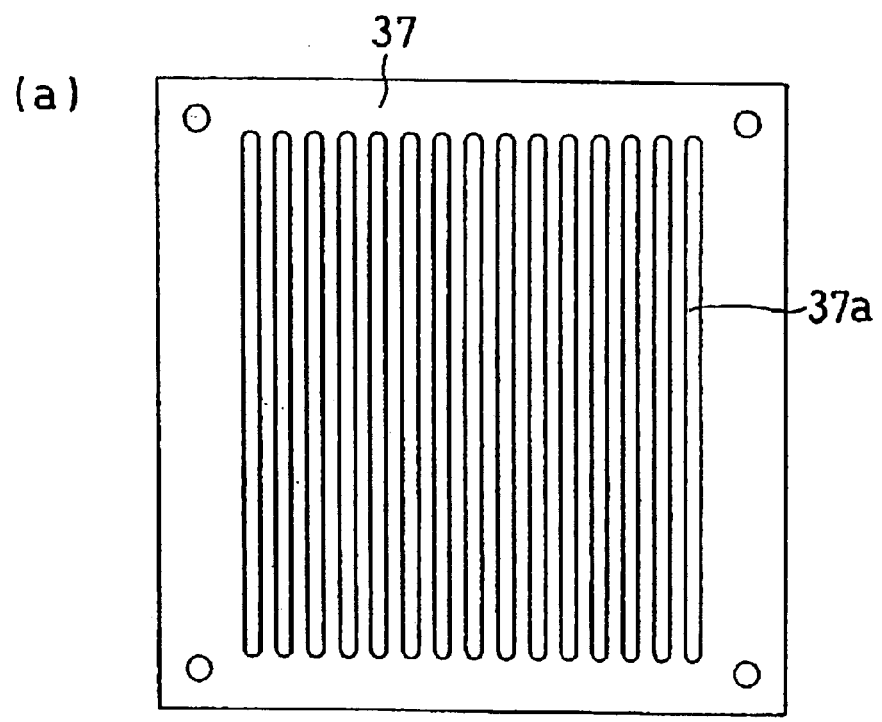
(b) 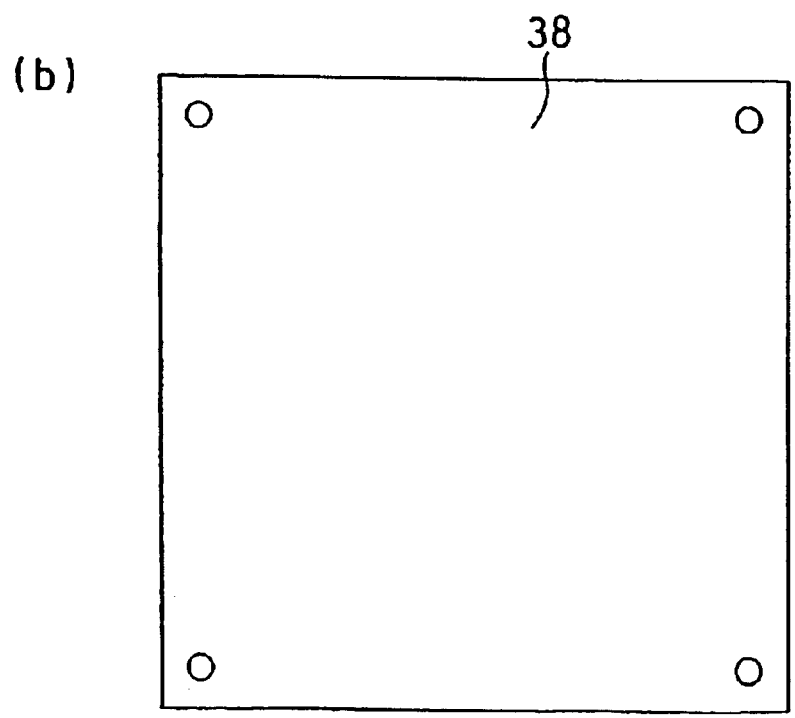

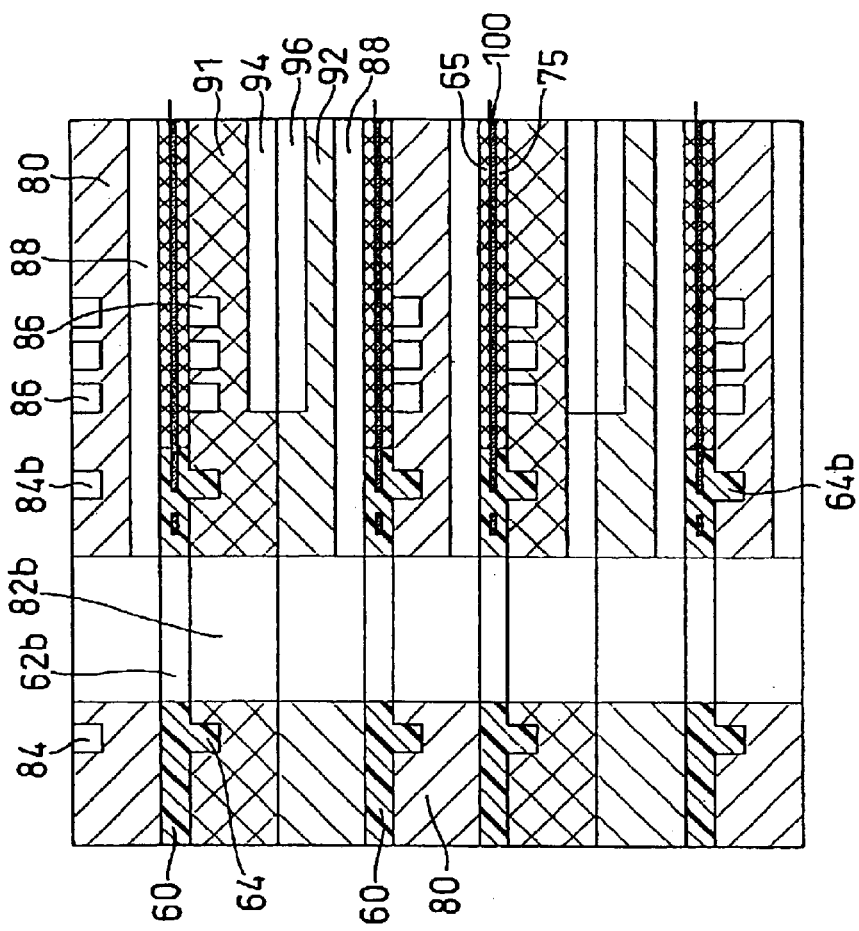

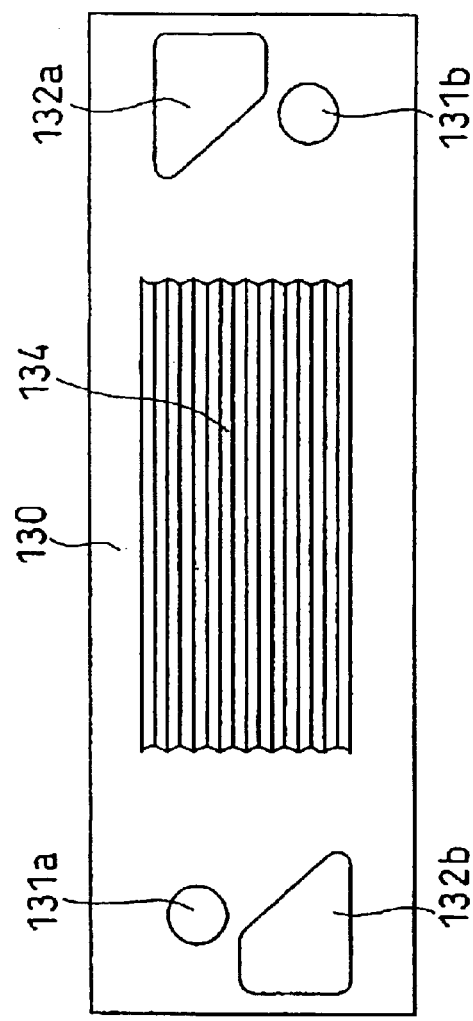
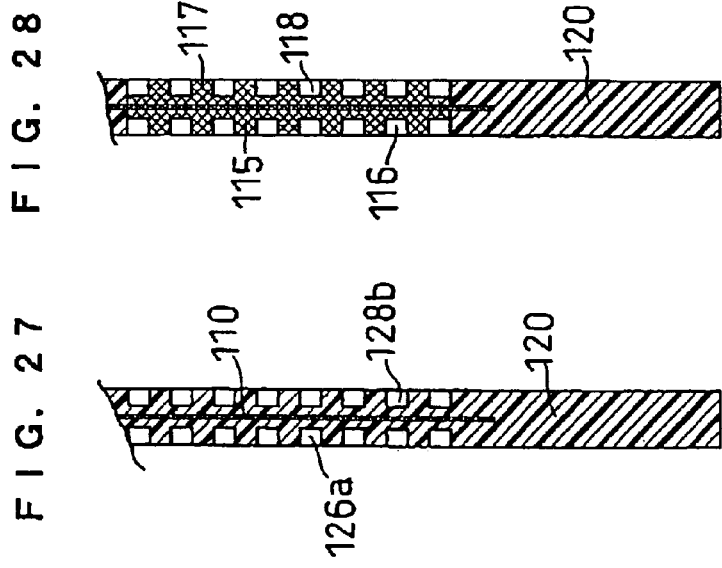

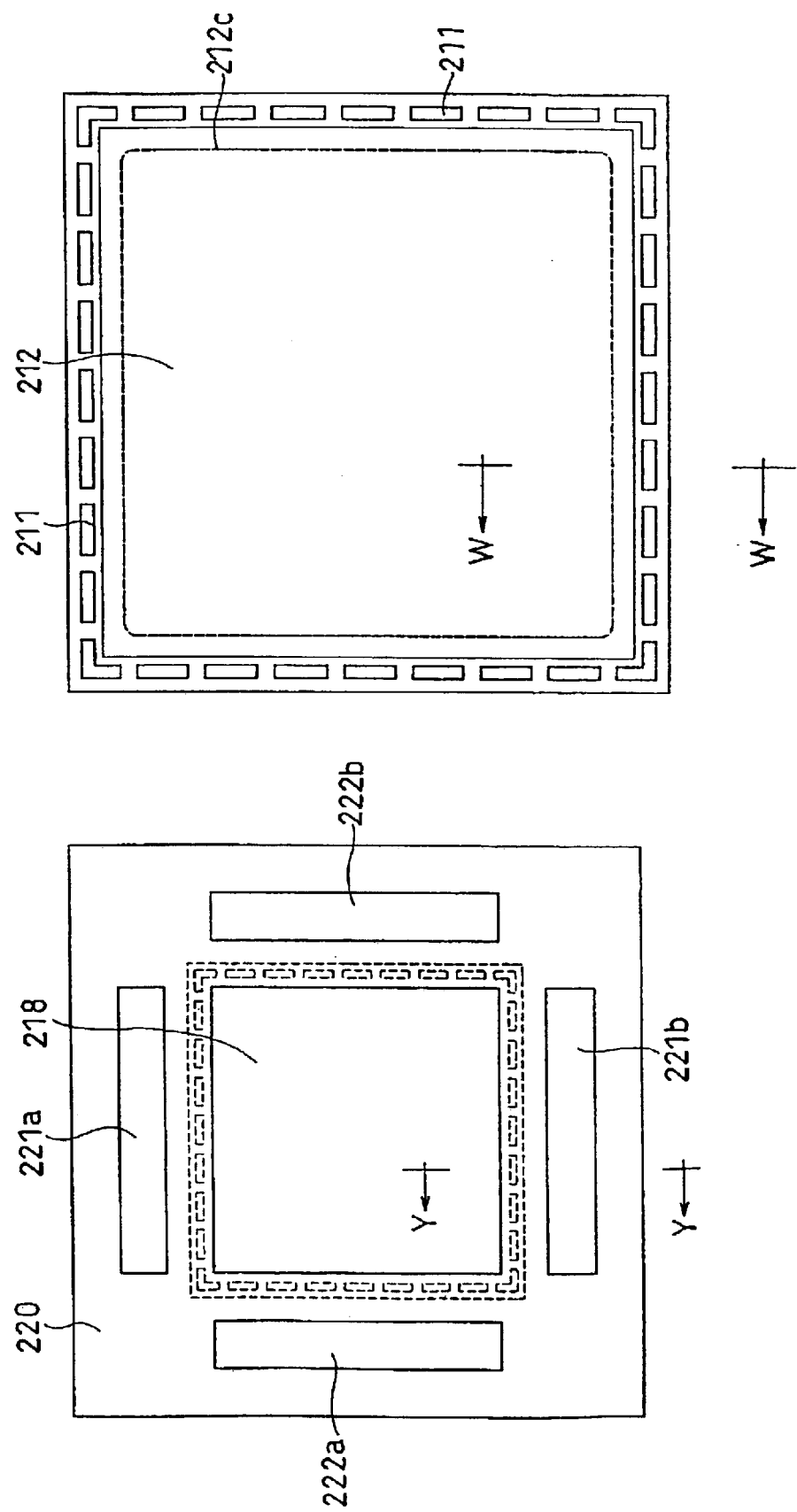

HIGH POLYMER ELECTROLYTE FUEL CELL AND ELECTROLYTE FILM-GASKET ASSEMBLY FOR THE FUEL CELL

TECHNICAL FIELD

The present invention relates to a solid polymer electrolyte fuel cell, and more particularly relates to an improvement in an assembly comprising an electrolyte membrane and a gasket arranged on the peripheral portion of the electrolyte membrane.

BACKGROUND ART

A fuel cell comprising a polymer electrolyte membrane generates electric power and heat simultaneously by electrochemically reacting a fuel gas containing hydrogen and an oxidant gas containing oxygen such as air. This fuel cell is basically composed of a polymer electrolyte membrane for selectively transporting hydrogen ions and a pair of electrodes formed on both surfaces of the polymer electrolyte membrane, i.e., an anode and a cathode. The electrode usually comprises a catalyst layer which is composed mainly of carbon particles carrying a platinum group metal catalyst and is formed on the surface of the polymer electrolyte membrane and a diffusion layer which has both gas permeability and electronic conductivity and is formed on the outer surface of the catalyst layer.

In order to prevent the fuel gas and oxidant gas supplied to the electrodes from leaking out or prevent these two kinds of gases from mixing together, gaskets are arranged on the periphery of the electrodes with the polymer electrolyte membrane therebetween. The gaskets are normally composed of a rubber or an elastomer having high chemical resistance such as EPDM rubber, silicone elastomer and fluoro-elasomer. The gaskets are combined integrally with the electrodes and polymer electrolyte membrane beforehand. This is called "MEA" (electrolyte membrane-electrode assembly). Disposed outside the MEA are conductive separator plates for mechanically securing the MEA and for connecting adjacent MEAs electrically in series, or in some cases, in parallel. The separator plates have a gas flow channel for supplying a reaction gas to the electrode surface and for removing a generated gas and an excess gas at a portion to come in contact with the MEA. Although the gas flow channel may be provided separately from the separator plates, grooves are usually formed on the surfaces of the separator plates to serve as the gas flow channel.

In order to supply the fuel gas and oxidant gas to such grooves, it is necessary to use piping jigs which branch respective supply pipes for fuel gas and oxidant gas, depending on the number of the separator plates to be used, and connect the branches directly to the grooves of the separator plates. This jig is called "manifold", and the above-described type, directly connecting the supply pipes for fuel gas and oxidant gas with the grooves, is called "external manifold". A manifold having a simpler structure is called "internal manifold". In the internal manifold, the separator plates with the gas flow channel formed thereon are provided with through holes which are connected to the inlet and outlet of the gas flow channel such that the fuel gas and oxidant gas are supplied directly from these holes.

Since the fuel cell generates heat during operation, it needs cooling with cooling water or the like to keep the cell under good temperature conditions. Normally, a cooling section for flowing the cooling water therein is formed every one to three cells. The cooling section is inserted between the separator plates in one structure and the cooling section is formed by providing the backsides of the separator plates with a cooling water flow channel in the other structure, and the latter is often employed. In a general structure of the fuel cell, the MEAs, separator plates and cooling sections are alternately stacked to form a stack of 10 to 200 cells, and the resultant stack is sandwiched by end plates with current collector plates and insulating plates and is clamped with clamping bolts from both sides.

A serious problem in this type of fuel cells is gas cross leakage. FIG. 44 illustrates the structure in the vicinity of a manifold aperture for the oxidant gas in a fuel cell having the above-described structure. An MEA, composed of a polymer electrolyte membrane 1, an anode 5 and a cathode 7 sandwiching the polymer electrolyte membrane 1 therebetween, and two pieces of gasket 3 arranged on the outer circumference of these members, is sandwiched between two conductive separator plates 4. A flow channel 8 for the oxidant gas is formed in one surface of each of the conductive separator plates 4, while a flow channel 6 for a fuel gas is provided in the other surface thereof. Accordingly, in the gas flow channel section near the manifold aperture 2, the gasket 3 is not supported by the separator plate 4. Therefore, deformation of the gasket, namely hanging down into the gas flow channel 8, occurs. As a result, in two positions, leakage paths running from the anode to the oxidant gas manifold aperture 2 are created. One is a leakage path resulting from the detachment of the gasket from the anode side of the separator plate, and the other is a leakage path caused by the detachment of the gasket from the electrolyte membrane as a result of hanging down of the gasket into the gas flow channel.

For the electrolyte membrane, in general, a perfluorosulfonic acid membrane is used. This is a modified fluorocarbon resin membrane and has poor surface activity and no adhesiveness with respect to the gasket, and therefore the gasket easily detaches from the electrolyte membrane when the gasket deforms. Consequently, when the fuel gas pressure is higher than the oxidant gas pressure, for example, the fuel gas leaks from the anode of a particular cell to the oxidant gas manifold aperture, thereby mixing with the oxidant gas. In the case of a cell stack, the oxidant gas to be supplied to other cell also contains the fuel gas leaked from the particular cell. In other words, gas cross leakage in one cell gives a considerable damage to the overall cell characteristics of the cell stack. Note that while the explanation has been made by illustrating the vicinity of the oxidant gas manifold aperture as an example in FIG. 44, the same explanation can also be given for the vicinity of the fuel gas manifold aperture.

In order to solve the above problem, there is a conventional example in which a bridge 9 for supporting the gasket is provided in the vicinity of the manifold aperture 2 in the gas flow channel 8 so as to prevent the gasket from hanging down. In this technique, however, for each cell, a total of four brides need to be provided in the vicinity of the inlet-side and outlet-side manifold apertures for each of the fuel gas and oxidant gas. In the case of a cell stack, a significant increase in the number of parts is particularly unavoidable, resulting in a problem of very difficult assembly. Moreover, the separator plate needs to be made thicker by an amount corresponding to the thickness of the bridge and that may cause considerable deterioration in the volume power density. A separator plate mainly used nowadays is the one produced by using about a 2 mm thick glassy carbon or stainless steal plate such as SUS316 as the base material, and by forming flow channels by machine work or press molding and then applying various surface treatments for anti-corrosion purposes if the separator plate is made of metal. Since the mean depth of the gas flow channel in the vicinity of the manifold aperture is reduced by the bridge, at least the gas channel in the vicinity of the manifold aperture needs to be dug deeper for compensation. For this reason, it is difficult to implement the above-mentioned structure without increasing the overall thickness of the separator plate. For instance, when the normal separator plate thickness is 2 mm, if the thickness of the separator plate is increased by 1 mm because of the above-mentioned technique, then the volume power density will be lowered to ⅔.

Furthermore, there is a problem of accuracy of processing the separator plates and the brides. In other words, the effect of the above-mentioned bridge structure will be exhibited when the flow channel depth and the bridge height on the separator plate side perfectly agree with each other over the all flow channel paths. In an actual fact, however, it is hard to expect such a precise processing accuracy, and thus it is possible to reduce the amount of gas leakage but impossible to perfectly prevent the leakage.

A further problem is concerning the processing cost of the separator plates. As described above, in a conventional separator plate, the flow channels are formed by cutting the base material by machine work such as milling. Since the machine work is a batch process, it has very poor mass productivity and takes enormous costs. In order to improve these aspects, there has been a tested technique in which, when the separator material is carbon, a small amount of resin material is mixed into the carbon material, and then the mixture is three-dimensionally molded using a technique such as compression molding or injection molding. However, for fuel cells for use in vehicles, particularly, metal separator plates are advantageous because carbon that is a brittle material may be broken by vibration.

Then, in order to solve the above problem concerning the costs, there have been tested techniques in which a porous electrode itself is processed to have the flow channels, or a wavy metal plate or a corrugate fin metal plate is used as a separator plate, and the front and rear surfaces thereof are used as the flow channels. In this case, in order to prevent gas cross leakage, it is necessary to provide the gasket with flow channels for supplying and exhausting a reaction gas to/from the electrode through the manifold apertures. With some flat-surface gaskets, since the gas flow channels are closed, this technique is not available. However, there was no other effective process that can give a three-dimensional structure to a conventional gasket for use in a polymer electrolyte fuel cell.

It is an object of the present invention to solve the above-mentioned problems and to provide a polymer electrolyte fuel cell that achieves a high output density without gas cross leakage.

It is an object of the present invention to provide a polymer electrolyte fuel cell comprising an electrolyte membrane-electrode assembly with a gasket integrally joined on a peripheral portion of an electrolyte membrane.

It is an object of the present invention to provide a method for manufacturing an electrolyte membrane-gasket assembly or an electrolyte membrane-electrode assembly, capable of easily molding a gasket and forming a catalyst layer without damaging the electrolyte membrane in an assembling process, at high productivity.

In addition, it is an object of the present invention to provide a method for manufacturing an electrolyte membrane-gasket assembly or an electrolyte membrane-electrode assembly, capable of solving a problem associated with a method of forming a gasket directly on a polymer electrolyte membrane, i.e., a problem concerning the protection of the polymer electrolyte membrane, and a matching problem between the process of molding a gasket and a process of printing a catalyst layer.

DISCLOSURE OF INVENTION

In order to prevent gas leakage due to detachment of a gasket from an electrolyte membrane, the present invention provides an electrolyte membrane-gasket assembly including a frame-type gasket in which the peripheral portion of the electrolyte membrane is covered with the gasket made of a seal material. In this electrolyte membrane-gasket assembly, the electrolyte membrane includes a sequence of a plurality of through-holes in the peripheral portion thereof, and a portion of the gasket covering one surface of the electrolyte membrane and a portion covering the other surface thereof are connected to each other through the through-holes of the electrolyte membrane.

The present invention provides an electrolyte membrane-gasket assembly further including catalyst layers carried on both surfaces of the polymer electrolyte membrane, respectively, and protective films, respectively, covering sections spanning from a peripheral portion of each of the catalyst layers to the peripheral portion of the polymer electrolyte membrane. In this electrolyte membrane-gasket assembly, the gasket covers sections spanning from a peripheral portion of each of the protective films to a peripheral edge of the polymer electrolyte membrane, the polymer electrolyte membrane and the protective films have a sequence of a plurality of piercing through-holes on the peripheral portions thereof, and a portion of the gasket covering one surface of the polymer electrolyte membrane and a portion covering the other surface thereof are connected to each other through the through-holes.

In a preferred embodiment of the present invention, the gasket includes an inlet-side manifold aperture and an outlet-side manifold aperture for each of a fuel gas and an oxidant gas, and has, in one surface thereof, gas flow channels for supplying the fuel gas to an anode formed in an exposed surface of the electrolyte membrane or the catalyst layer from the fuel gas inlet-side manifold aperture and for exhausting the gas from the anode to the fuel gas outlet-side manifold aperture, and has, in the other surface thereof, gas flow channels for supplying the oxidant gas to a cathode formed in an exposed surface of the electrolyte membrane or the catalyst layer from the oxidant gas inlet-side manifold aperture and for exhausting the gas from the cathode to the oxidant gas outlet-side manifold aperture.

The present invention provides a method for manufacturing an electrolyte membrane-gasket assembly for a fuel cell, comprising the steps of: forming catalyst layers on both surfaces of a polymer electrolyte membrane, respectively, except for a peripheral portion thereof: coating a protective film on each of both surfaces of the polymer electrolyte membrane on which the catalyst layers were formed; cutting the peripheral portion of the polymer electrolyte membrane and the protective films together into a predetermined size and forming a sequence of a plurality of through-holes piercing the peripheral portion; and injection-molding a seal material so as to form a gasket integrally on the peripheral portion, including the through-holes, of the polymer electrolyte membrane having the protective films.

The present invention also provides a polymer electrolyte fuel cell incorporating such an electrolyte membrane-gasket assembly therein.

Moreover, by using the advantage of injection molding that can provide a molded product in any shape, the present invention prevents gas leakage due to hanging down of the gasket into the gas flow channels of the separator plates by providing the gasket with ribs and fitting the ribs into grooves formed in the separator plates. In other words, since the gasket is made of an elastic material, the ribs are fixed as being fitted into the separator plates by appropriate designs, thereby preventing the gasket from hanging down into the gas flow channels. By arranging the ribs to perform the function as walls that block gases cross leaking into the manifold apertures from the MEA, it is possible to achieve an extremely high pressure-proof seal as compared to a conventional example.

Furthermore, the present invention moves, to the gasket, part of the gas flow channels extending from the manifold apertures to the MEA and combines the gasket with MEA component members or separator plates produced by an inexpensive processing technique such as porous electrodes having gas flow channels or metal separator plates pressed into a wavy form in order to construct a gas flow channel mechanism of a cell. With this construction, it is possible to achieve a lowering of the manufacturing cost as well as an improvement in the volume output density.

BRIEF DESCRIPTION OF DRAWINGS

FIG. 16 is a front view of electrode component materials used in the same example.

FIG. 23 is a cross sectional view cut along the XXIII—XXIII line of FIG. 21.

FIG. 24 is a cross sectional view of a cell stack of the same example when cut along the XXIV—XXIV line of FIG. 21.

FIG. 27 is a cross sectional view cut along the XXVII—XXVII line of FIG. 25.

FIG. 28 is a cross sectional view cut along the XXVIII—XXVIII line of FIG. 25.

FIG. 29 is a front view of the cathode side of a conductive separator plate according to still another example of the present invention.

FIG. 32 is a front view of an MEA according to another example of the present invention.

FIG. 33 is a front view of an assembly comprising the electrolyte membrane, catalyst layers and protective films of the same MEA.

BEST MODE FOR CARRYING OUT THE INVENTION

Figure 1:
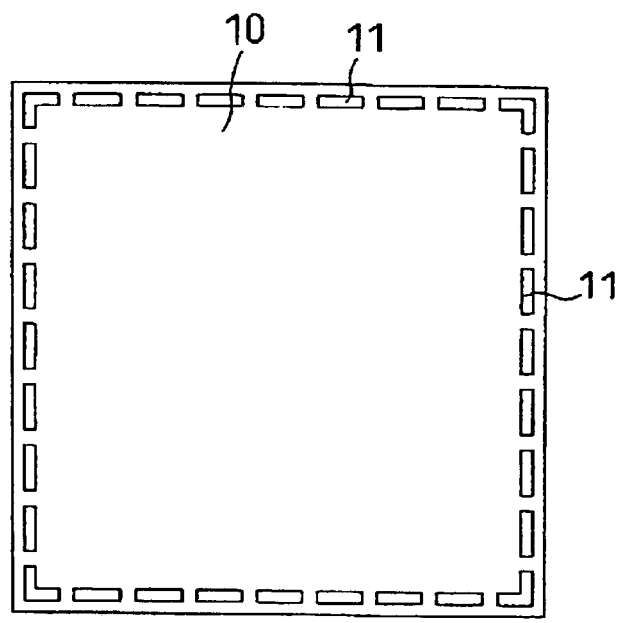
FIG. 1 is a front view of an electrolyte membrane according to one example of the present invention.
Figure 2:
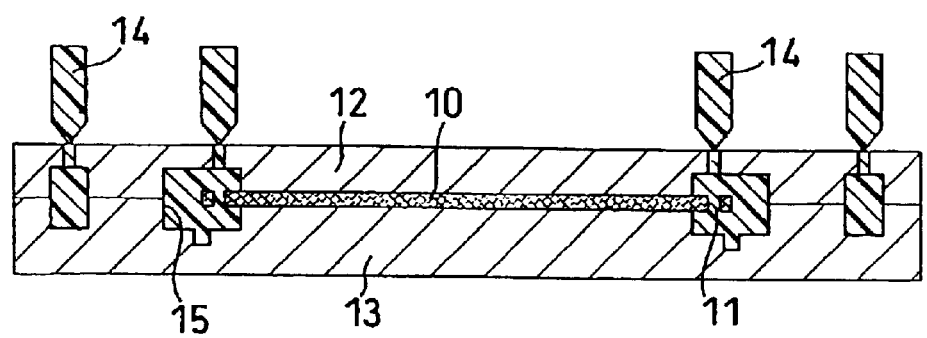
FIG. 2 is a vertical cross sectional view of a mold for molding a gasket on the electrolyte membrane.
Figure 3:
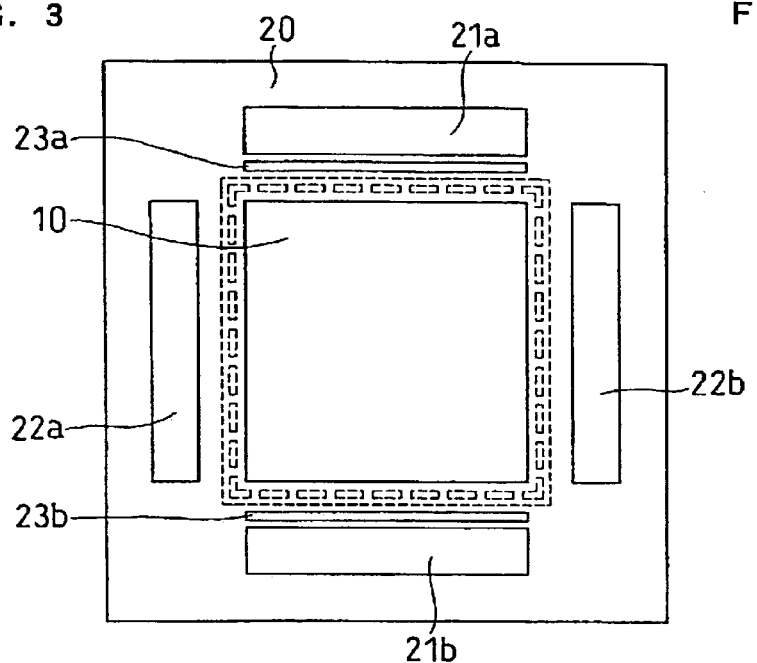
FIG. 3 is a front view of the cathode side of an electrolyte membrane-gasket assembly according to one example of the present invention.
Figure 4:
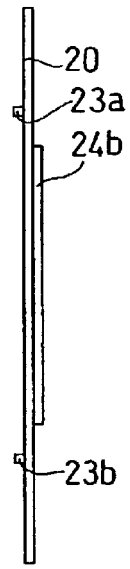
FIG. 4 is a right side view of the electrolyte membrane-gasket assembly.
Figure 5:
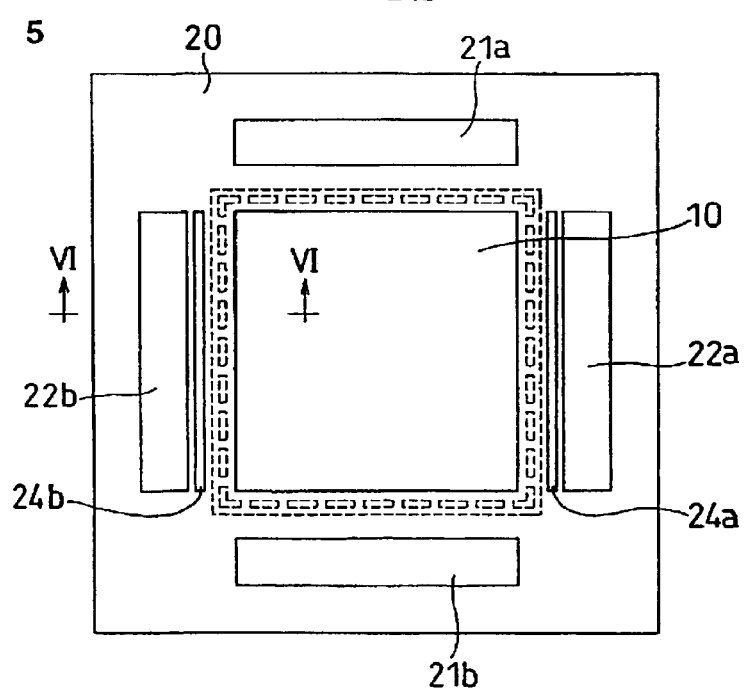
FIG. 5 is a rear view of the electrolyte membrane-gasket assembly.
Figure 6:
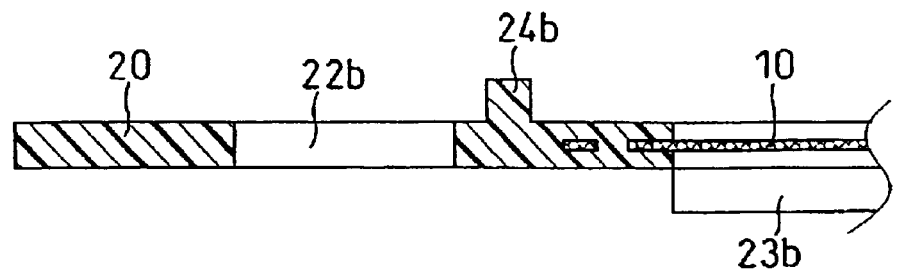
FIG. 6 is a cross sectional view cut along the VI—VI line of FIG. 5.

The present invention provides a polymer electrolyte fuel cell, comprising:

an electrolyte membrane-electrode assembly including a polymer electrolyte membrane whose peripheral portion is covered with a gasket made of a seal material, an anode joined to one surface of the electrolyte membrane, and a cathode joined to the other surface of the electrolyte membrane;

an anode-side conductive separator plate and a cathode-side conductive separator plate, sandwiching the electrolyte membrane-electrode assembly therebetween; and gas supply means for supplying a fuel gas and an oxidant gas to the anode and the cathode, respectively, wherein the electrolyte membrane has a sequence of a number of through-holes in the peripheral portion thereof, and a portion of the gasket covering one surface of the electrolyte membrane and a portion covering the other surface thereof are connected to each other through the through-holes of the electrolyte membrane.

In another aspect, the present invention provides a polymer electrolyte fuel cell, comprising:

an electrolyte membrane-electrode assembly including a polymer electrolyte membrane, catalyst layers carried on both surfaces of the polymer electrolyte membrane, respectively, protective films covering, respectively, sections spanning from a peripheral portion of each of the catalyst layers to a peripheral portion of the polymer electrolyte membrane, a gasket, made of a seal material, covering sections spanning from a peripheral portion of each of the protective films to a peripheral edge of the polymer electrolyte membrane, and gas diffusion layers joined to the catalyst layers to construct an anode and a cathode, respectively;

an anode-side conductive separator plate and a cathode-side conductive separator plate, sandwiching the electrolyte membrane-electrode assembly therebetween; and gas supply means for supplying a fuel gas and an oxidant gas to the anode and the cathode, respectively, wherein the polymer electrolyte membrane and the protective films have a sequence of a plurality of piercing through-holes in the peripheral portions thereof, and a portion of the gasket covering one side of the polymer electrolyte membrane and a portion covering the other side thereof are connected to each other through the through-holes.

It is preferred that the peripheral portion of the catalyst layer is covered up in the gasket with the protective film therebetween and does not reach the through-holes.

It is preferred that a part of the protective film physically penetrates into and is fused to a part of the diffusion layer.

Each of the anode-side conductive separator plate and the cathode-side conductive separator plate for use in the present invention may be fabricated independently, or the anode-side conductive separator plate and the cathode-side conductive separator plate may be made of one sheet of separator plate so that one side thereof serves as the anode-side conductive separator plate and the other side as the cathode-side conductive separator plate.

Since the electrolyte membrane-gasket assembly according to the present invention enables an extremely thin electrolyte membrane to be self-supporting, it can be easily handled when assembling a cell.

In a preferred embodiment of the present invention, the gasket have ribs on the surfaces thereof facing the anode-side conductive separator plate and the cathode-side conductive separator plate, respectively, and the ribs fit into grooves formed in the anode-side conductive separator plate and the cathode-side conductive separator plate, respectively.

In a more preferred embodiment of the present invention, the gas supply means includes an inlet-side manifold aperture and an outlet-side manifold aperture piercing the anode-side conductive separator plate, the cathode-side conductive separator plate and the gasket, for each of a fuel gas and an oxidant gas, the gasket has ribs on a surface thereof facing the anode-side conductive separator plate, at positions separating the oxidant gas manifold apertures from the anode, and ribs on a surface thereof facing the cathode-side conductive separator plate, at positions separating the fuel gas manifold apertures from the cathode, and the ribs fit into grooves formed in the anode-side conductive separator plate and the cathode-side conductive separator plate, respectively.

Here, it is possible that the ribs formed on the cathode-side surface of the gasket are positioned between the cathode and the fuel-gas inlet-side and outlet-side manifold apertures with the cathode therebetween, and the distance between the ribs is made slightly different from the distance between the grooves formed in the conductive-separator plate to fit the ribs so that the outer side faces of the ribs come into contact with the outer side faces of the grooves, or the inner side faces of the ribs come into contact with the inner side faces of the grooves. For example, as a supply gas specification for a fuel cell, when the anode gas pressure is higher than the cathode gas pressure, the following design is preferable for the sealing structure. In other words, the inner side faces of the cathode-side ribs of the gasket are arranged to be always in contact with the inner side faces of the grooves in the separator plate. Besides, the outer side faces of the ribs, provided on the anode-side surface of the gasket between the oxidant-gas inlet-side and outlet-side manifold apertures and the anode with the anode therebetween, are arranged to be in contact with the outer side faces of the grooves formed on the anode side of the separator plate.

More specifically, by considering the molding shrinkage percentage, elastic deformation percentage and stack clamping force which are determined by the material of the gasket, an injection molding mold is designed so that the surface dimension (free distance when no load is applied) after the molding shrinkage of the ribs provided on the anode side of the gasket is about $1/1000$ to $5/1000$ larger than the surface dimension of the grooves formed on the anode side of the separator plate. Accordingly, the anode-side ribs are forcibly inserted into the grooves of the separator plate while being elastically deformed by the clamping pressure, and the outer side faces of the ribs come into contact with the outer side faces of the grooves. On the other hand, considering a dimensional change due to the elastic deformation, the dimensions of the cathode-side ribs of the gasket and the grooves of the separator plate are determined so that the inner side faces of the ribs come into contact with the inner side faces of the grooves.

Besides, completely contrary to this, it is possible to design the anode-side ribs and grooves by making the free distance of the inner side faces of the cathode-side ribs of the gasket smaller than that of the grooves of the separator plate for fitting the ribs and considering the elastic deformation caused by clamping ("expansion" of the gasket in this case).

The above-mentioned two types of designing methods differ simply in the designing order, and are substantially the same. However, for example, when the supply gas pressure is low and the difference in the pressure between the two electrodes is very small, it is not necessarily to exactly follow the above-described designing order. For instance, it is possible to adopt a configuration in which the outer side faces of both the anode-side and cathode-side ribs come into contact with the outer side faces of the corresponding fitting grooves, or, contrary to this, a configuration in which the inner side faces of the anode-side and cathode-side ribs come into contact with the inner side faces of the corresponding fitting grooves. It is needless to say that designing should be done appropriately and freely according to a cross-leak withstand pressure required for a fuel cell.

In another preferred embodiment of the present invention, the gas supply means includes inlet-side and outlet-side manifold apertures for each of the fuel gas and oxidant gas, which pierce the anode-side conductive separator plate, the cathode-side conductive separator plate and the gasket; the anode and cathode have flow channels for the fuel gas and oxidant gas, respectively, on the surface thereof which do not face the electrolyte membrane; and the gasket has gas flow channels for connecting the oxidant gas manifold apertures and the gas flow channel of the cathode, on a surface thereof facing the cathode-side conductive separator plate, and gas flow channels for connecting the fuel gas manifold apertures and the gas flow channel of the anode, on a surface thereof facing the anode-side conductive separator plate.

In a still another preferred embodiment of the present invention, the gas supply means includes inlet-side and outlet-side manifold apertures for each of the fuel gas and oxidant gas, which pierce the anode-side conductive separator plate, the cathode-side conductive separator plate and the gasket; the anode-side conductive separator plate and cathode-side conductive separator plate have flow channels for the fuel gas and oxidant gas on the surfaces thereof facing the anode and cathode, respectively; and the gasket has gas flow channels for connecting the oxidant gas manifold apertures and the gas flow channel of the cathode-side conductive separator plate, on a surface thereof facing the cathode-side conductive separator plate, and gas flow channels for connecting the fuel gas manifold apertures and the gas flow channel of the anode-side conductive separator plate, on a surface thereof facing the anode-side conductive separator plate.

The present invention provides a method for manufacturing a polymer electrolyte fuel cell, comprising the steps of: forming catalyst layers on both surfaces of a polymer electrolyte membrane, respectively, except for a peripheral portion thereof: coating a protective film on each of both surfaces of the polymer electrolyte membrane on which the catalyst layers were formed; cutting the peripheral portion of the polymer electrolyte membrane and the protective films together into a predetermined size and forming a sequence of a plurality of piercing through-holes in the peripheral portion; injection-molding a seal material so as to form a gasket integrally on the peripheral portion, including the through-holes, of the polymer electrolyte membrane having the protective films; and detaching the protective films from the catalyst layers while leaving the peripheral portions thereof.

It is preferred that the protective film is provided in advance with a cutting line for specifying a portion to be detached.

On an exposed portion of the catalyst layer from which the protective film was detached, a gas diffusion layer is positioned. For this gas diffusion layer, it is preferable to perform an additional step for causing a part of the protective film to penetrate into the gas diffusion layer by thermo-compression bonding. Alternatively, it is preferable to use the protective film for an adhesion width and to bond the gas diffusion layer to the protective film with an adhesive or a double sided adhesive sheet.

The gasket of the present invention is made of a thermoplastic resin or a thermoplastic elastomer. Suitable materials are selected from the group consisting of polyethylene, polypropylene, polybutylene, polystyrene, polyvinyl chloride, polyvinylidene chloride, polyvinyl alcohol, polyacrylamide, polyamide, polycarbonate, polyacetal, polyurethane, silicone, fluorocarbon resin, polybutylene terephthalate, polyethylene terephthalate, polyethylene naphthalate, syndiotactic polystyrene, polyphenylene sulfide, polyether ether ketone, polyether ketone, liquid crystal polymer, polyether nitrile, modified polyphenylene ether, polysulfone, polyether sulfone, polyarylate, polyamide imide, polyether imide, and thermoplastic polyimide.

Generally, the following must be noted in selecting a protective film.

First, since the protective film remains as a part of the electrolyte membrane-gasket assembly, the protective film is in contact with the electrolyte membrane and highly reactive catalyst layer during the operation of a cell using this assembly. Therefore, the protective film is preferably chemically inactive.

Moreover, in order to prevent a reduction of the catalyst layer by a transfer of a part of the catalyst layer to the protective film when cutting off the center part of the protective film covering the most part of the electrolyte membrane along the cutting line, the protective film is preferably non-adhesive. Normally, chemically inactive substances are non-adhesive. If the protective film is too thin, the catalyst layer is not sufficiently protected from the mold for molding the gasket. On the other hand, if the protective film is too thick, when the peripheral portion of the gas diffusion layer is positioned on the protective film as to be described later, the protective film will interfere with a sufficient contact between the gas diffusion layer and the catalyst layer. Considering these facts, the thickness of the protective film is preferably around 10 to 30 $\mu$m. Accordingly, preferred materials are those that can be drawn to such a thickness.

Suitable materials for the protective film are selected from the group consisting of polyethylene, polypropylene, polybutylene, polyvinylidene chloride, polyvinyl alcohol, polyacrylamide, polyamide, polycarbonate, silicone, fluorocarbon resin, polybutylene terephthalate, polyethylene terephthalate, polyethylene naphthalate, polyphenylene sulfide, polyether ether ketone, polyether ketone, liquid crystal polymer, polyether nitrile, modified polyphenylene ether, polysulfone, polyether sulfone, polyarylate, polyamide imide, polyether imide, and thermoplastic polyimide.

The following description will explain the present invention in further detail with reference to the drawings.

Embodiment 1

FIGS. 3 through 6 show an electrolyte membrane-gasket assembly according to this embodiment. This assembly comprises an electrolyte membrane 10, and a gasket 20 joined integrally to the peripheral portion of the electrolyte membrane 10 by injection molding. As illustrated in FIG. 1, formed in the peripheral portion of the electrolyte membrane 10 are a number of through-holes 11. This electrolyte membrane 10 is set in a mold composed of a cavity mold 12 and a core mold 13, and the frame-like gasket 20 is molded on the peripheral portion of the electrolyte membrane 10 by an insert injection molding process in which a melted thermoplastic resin or thermoplastic elastomer is poured into a molded product section 15 from gates 14.

The gasket 20 thus molded comprises a portion covering one surface of the electrolyte membrane 10 and a portion covering the other surface thereof, which are connected to each other through the regularly arranged through-holes 11 in the peripheral portion of the electrolyte membrane. Moreover, the gasket 20 completely covers the outer circumference of the electrolyte membrane. Therefore, the electrolyte membrane 10 will never fall off from the gasket 20. Besides, gas leakage into a manifold aperture due to a detachment of the electrolyte membrane 10 from the gasket 20 will never occur. Normally, it is hard to expect the adhesiveness of the electrolyte membrane with respect to other resin material. However, according to the above-described structure, irrespective of the presence or absence of the adhesiveness, it is possible to completely prevent gas leakage due to a detachment of the electrolyte membrane from the gasket.

The gasket 20 has inlet-side and outlet-side manifold apertures 21a, 21b for a fuel gas, and inlet-side and outlet-side manifold apertures 22a, 22b for an oxidant gas. These manifold apertures are provided outside of the portion of the gasket which covers the electrolyte membrane 10.

The gasket 20 has ribs 23a and 23b on a surface thereof facing a cathode-side conductive separator plate, at positions separating the fuel gas manifold apertures 21a and 21b from a cathode. Moreover, the gasket 20 has ribs 24a and 24b on a surface thereof facing an anode-side conductive separator plate, at positions separating the oxidant gas manifold apertures 22a and 22b from an anode.

As described above, a cathode 17 is joined to one exposed portion of the electrolyte membrane 10 having the gasket 20 integrally joined thereto, while an anode 15 is joined to the other exposed portion thereof, thereby constructing an electrolyte membrane-electrode assembly (MEA).

Figure 7:
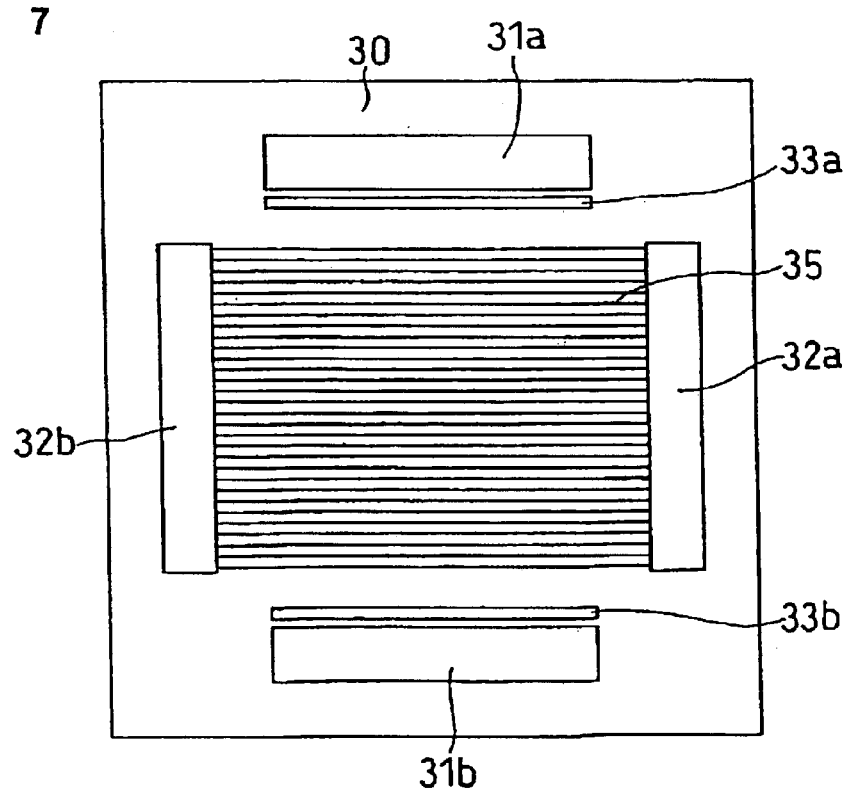
FIG. 7 is a front view of the cathode side of a conductive separator plate according to one example of the present invention.
Figure 8:
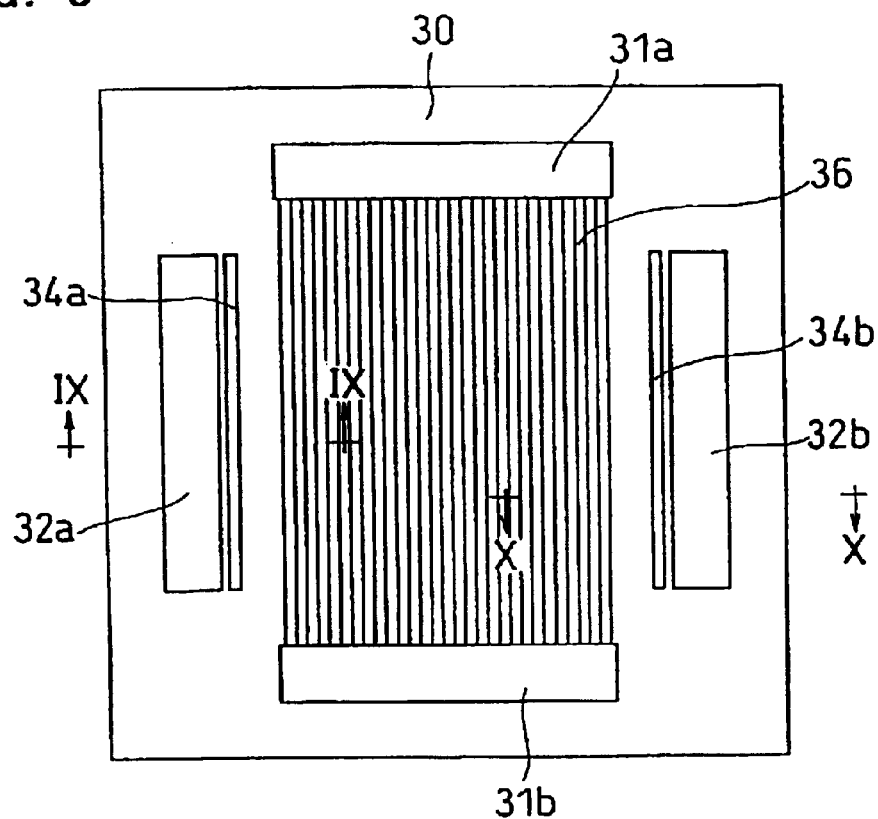
FIG. 8 is a rear view of the conductive separator plate.
Figure 9:
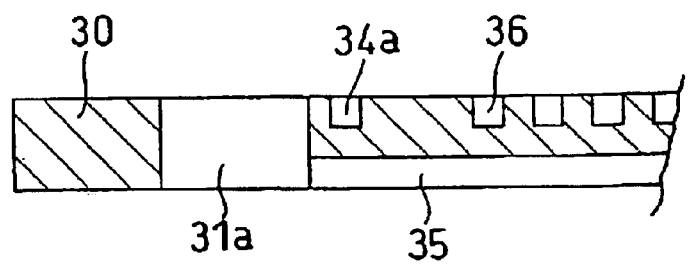
FIG. 9 is a cross sectional view cut along the IX—IX line of FIG. 8.

FIGS. 7 through 9 illustrate a conductive separator plate to be combined with the MEA. This separator plate 30 has inlet-side and outlet-side manifold apertures 31a, 31b for the fuel gas, and inlet-side and outlet-side manifold apertures 32a, 32b for the oxidant gas. The separator plate 30 has, on a surface thereof facing the cathode, a gas flow channel 35 composed of a plurality of linear grooves connecting the manifold apertures 32a and 32b together, and grooves 33a and 33b into which the ribs 23a and 23b of the gasket 20 are to be fitted. In addition, provided on a surface of the separator plate 30 which faces the anode are a gas flow channel 36 composed of a plurality of linear grooves connecting the manifold apertures 31a and 31b, and grooves 34a and 34b into which the ribs 24a and 24b of the gasket 20 are to be fitted. The ribs 23a, 23b, 24a and 24b are preferably tapered.

Figure 10:
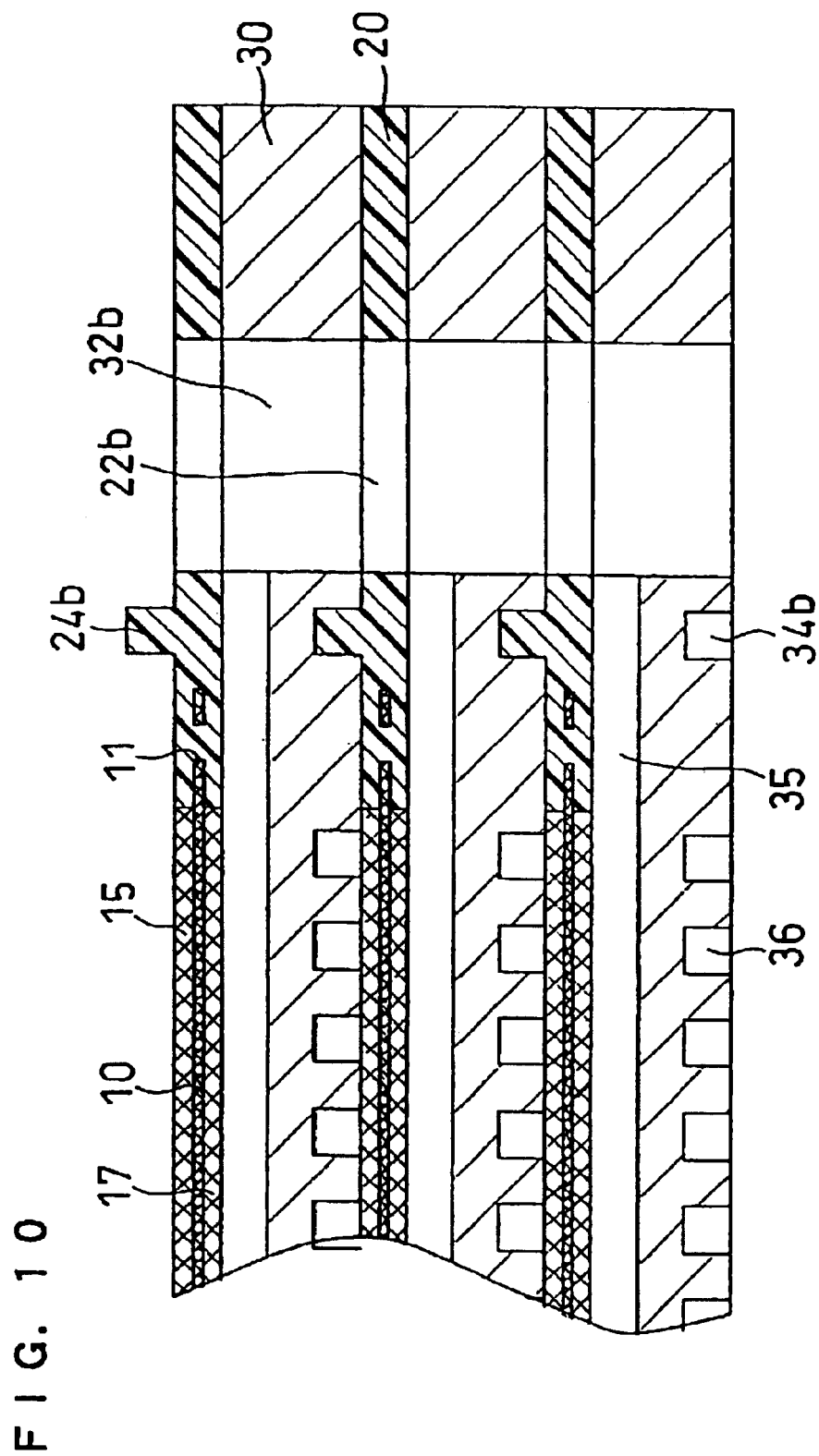
FIG. 10 is a cross sectional view of a cell stack according to one example of the present invention when cut along the X—X-line of FIG. 8.

FIG. 10 shows a cell structure in which the MEAs and the separator plates 30 are alternately stacked. It should be understood that the gasket 20 would hardly hang down into the gas flow channel 35 because the rib 24b of the gasket 20 is fitted into the groove 34b of the separator plate 30. Even when the gasket 20 slightly hangs down into the gas flow channel 35 at a position inside the rib 24b and creates a clearance between the lower surface of the separator plate 30 and the gasket 20, the fitted section of the rib 24 and groove 34b prevents the fuel gas flow channel 36 from connecting to the oxidant gas manifold aperture 22b (32b).

Besides, since the peripheral portion of the electrolyte membrane 10 does not reach the manifold apertures, structurally, gas leakage due to detachment of the electrolyte membrane from the gasket can never happen. Accordingly, gas cross leakage would hardly occur.

While the gas cross leakage near the oxidant gas outlet-side manifold aperture has been explained in above, gas cross leakage would hardly happen even in the vicinity of the oxidant gas inlet-side manifold aperture and the fuel gas inlet-side and outlet-side manifold apertures.

Embodiment 2

Figure 11:
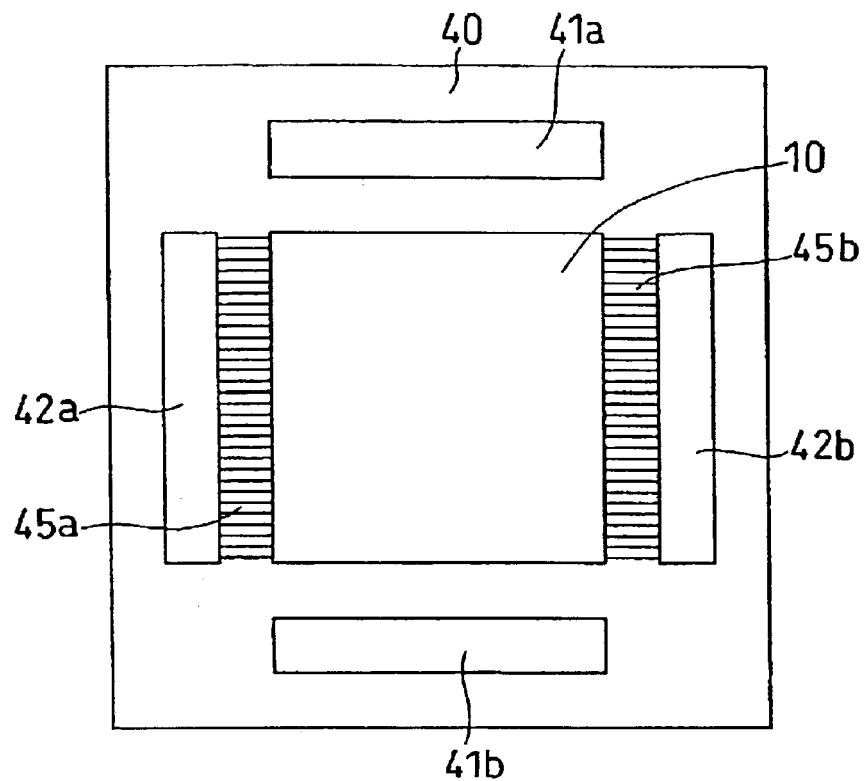
FIG. 11 is a front view of the cathode side of an electrolyte membrane-gasket assembly according to another example of the present invention.
Figure 12:
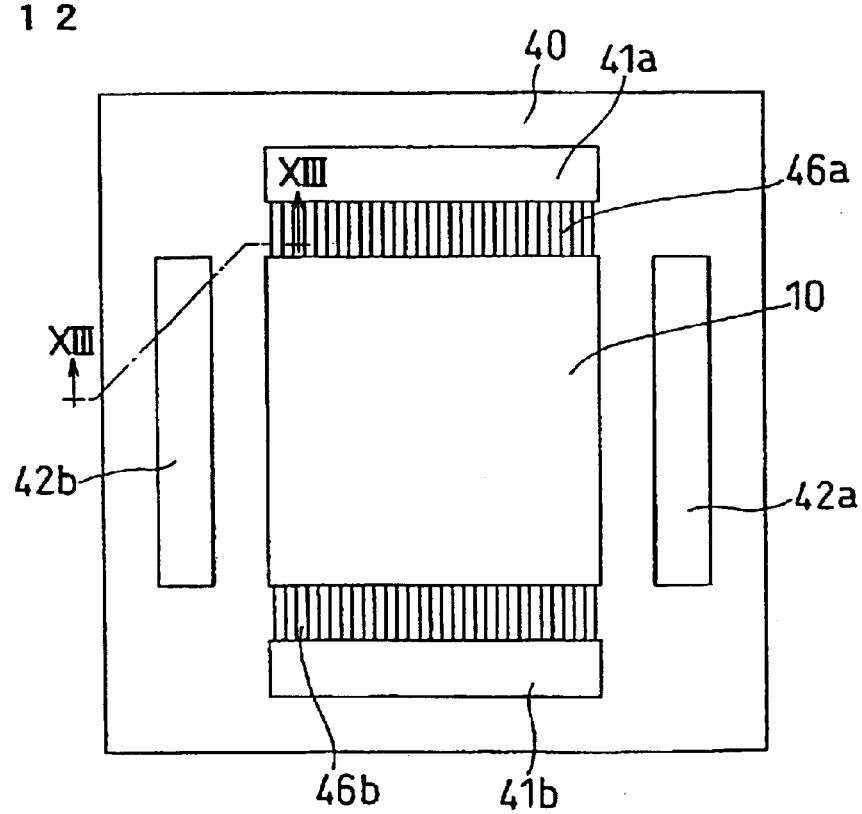
FIG. 12 is a rear view of the electrolyte membrane-gasket assembly.
Figure 13:
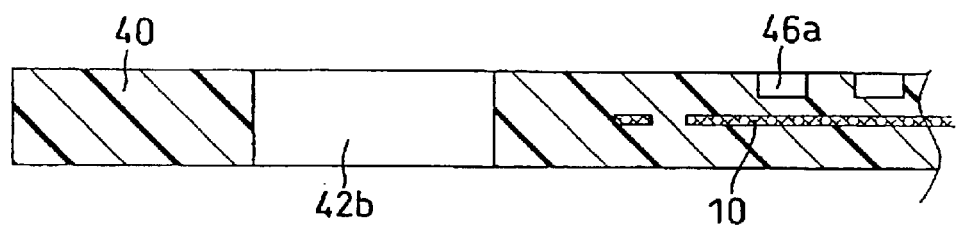
FIG. 13 is a cross sectional view cut along the XIII—XIII line of FIG. 12.

FIGS. 11 through 13 illustrate an electrolyte membrane-gasket assembly according to this embodiment. Like Embodiment 1, a gasket 40 joined integrally to the electrolyte membrane 10 has an inlet-side manifold aperture 41a and an outlet-side manifold aperture 41b for the fuel gas, and an inlet-side manifold aperture 42a and an outlet-side manifold aperture 42b for the oxidant gas. The gasket 40 further has, on a surface thereof facing the cathode-side conductive separator plate, gas flow channels 45a and 45b for connecting the cathode and the manifold apertures 42a and 42b, respectively, and, on a surface thereof facing the anode-side conductive separator plate, gas flow channels 46a and 46b for connecting the anode and the manifold apertures 41a and 41b, respectively.

Figure 14:
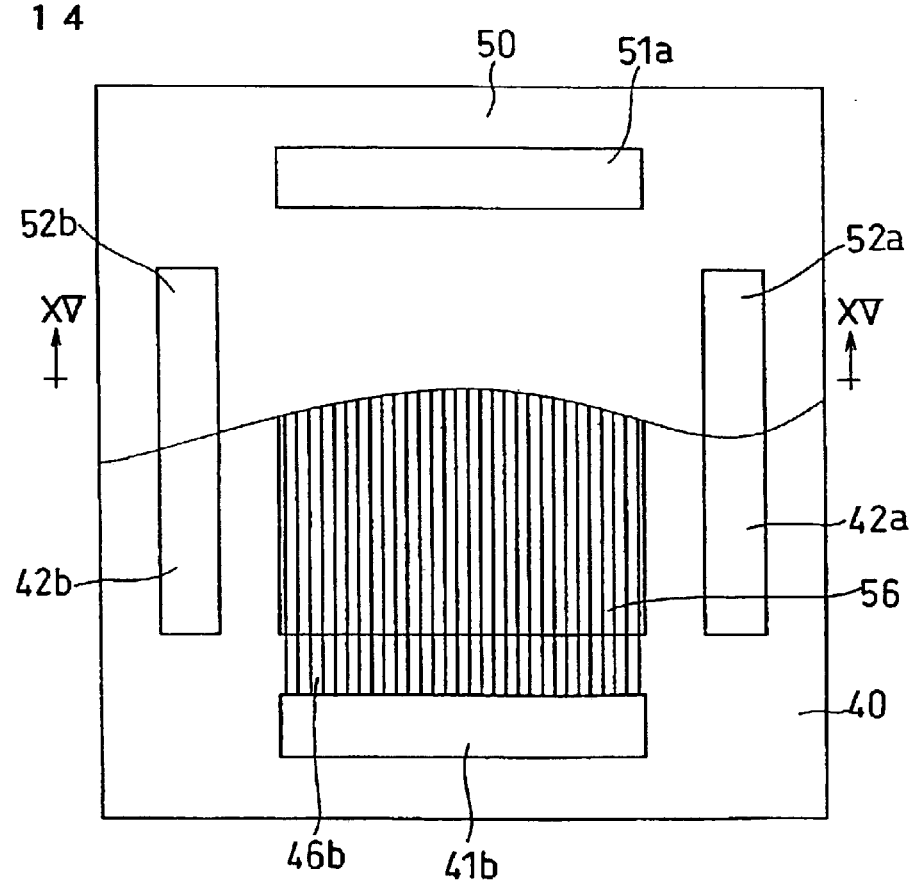
FIG. 14 is a partially broken front view of a cell stack according to another example of the present invention.
Figure 15:
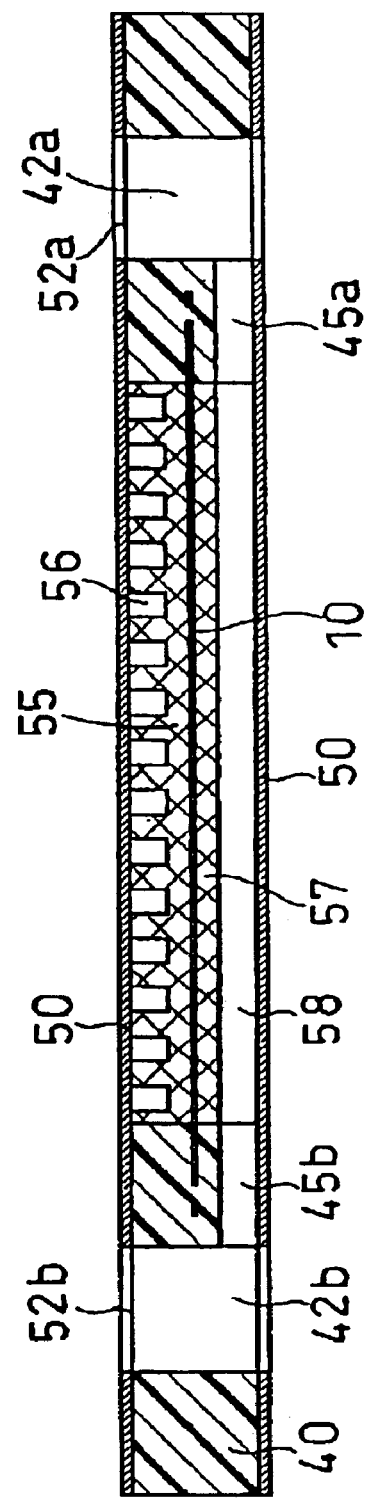
FIG. 15 is a cross sectional view cut along the XV—XV line of FIG. 14.

FIGS. 14 and 15 show a cell structure using this electrolyte membrane-gasket assembly. An anode 55 has, on a surface thereof that does not face the electrolyte membrane, a gas flow channel 56 connected to the gas flow channels 46a and 46b of the gasket 40. Similarly, a cathode 57 has, on a surface thereof that does not face the electrolyte membrane, a gas flow channel 58 connected to the gas flow channels 45a and 45b of the gasket 40. A conductive separator plate 50 has manifold apertures 51a, 52a, 52b, etc., but has no gas flow channel, and therefore it is possible to use a thin metal plate.

Figure 17:
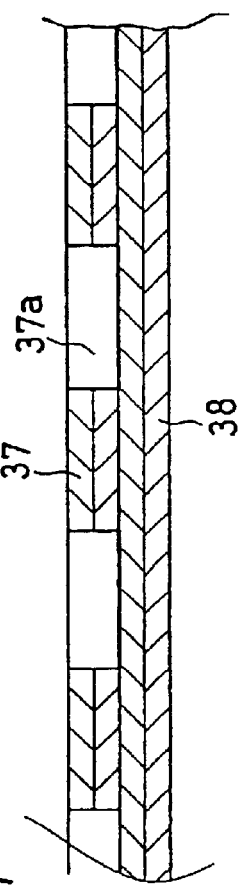
FIG. 17 is a cross sectional view of an essential part of an electrode produced from the electrode component materials.

As shown in FIG. 16, for example, an electrode having a gas flow channel can be fabricated by bonding a carbon fiber paper 37 having slits 37a for forming the gas flow channel and a carbon fiber paper 38 having no slits together, graphitizing them and then cutting off the edges. These papers 37 and 38 as the electrode material are provided with holes for positioning purposes. FIG. 17 shows an electrode fabricated by bonding two sheets of each of the papers 37 and 38 together. Since an electrode of such a kind is explained in detail in PCT/JP01/08661, the disclosure thereof is incorporated herein as a reference.

Embodiment 3

Figure 18:
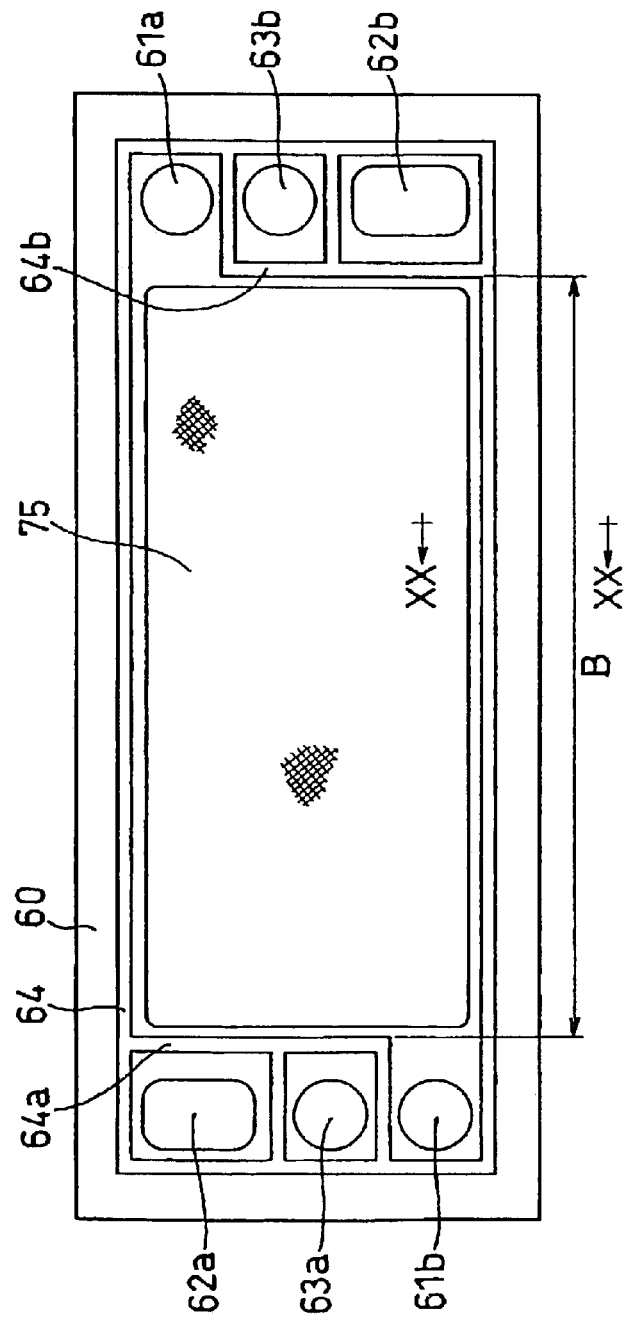
FIG. 18 is a front view of the anode side of an MEA according to still another example of the present invention.
Figures 19, 20:
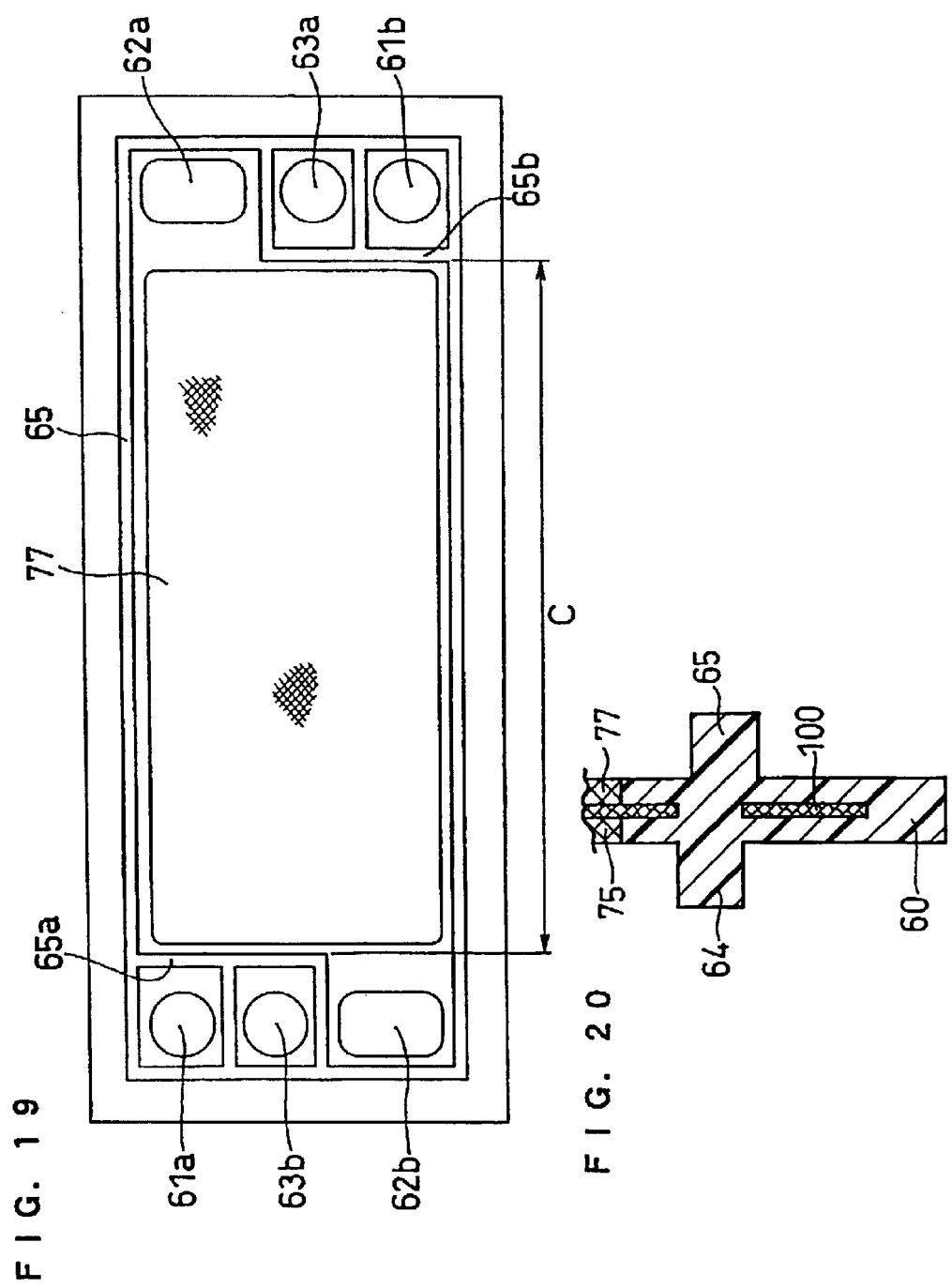
FIG. 19 is a rear view of the MEA.
FIG. 20 is a cross sectional view cut along the XX—XX line of FIG. 18.
Figure 21:
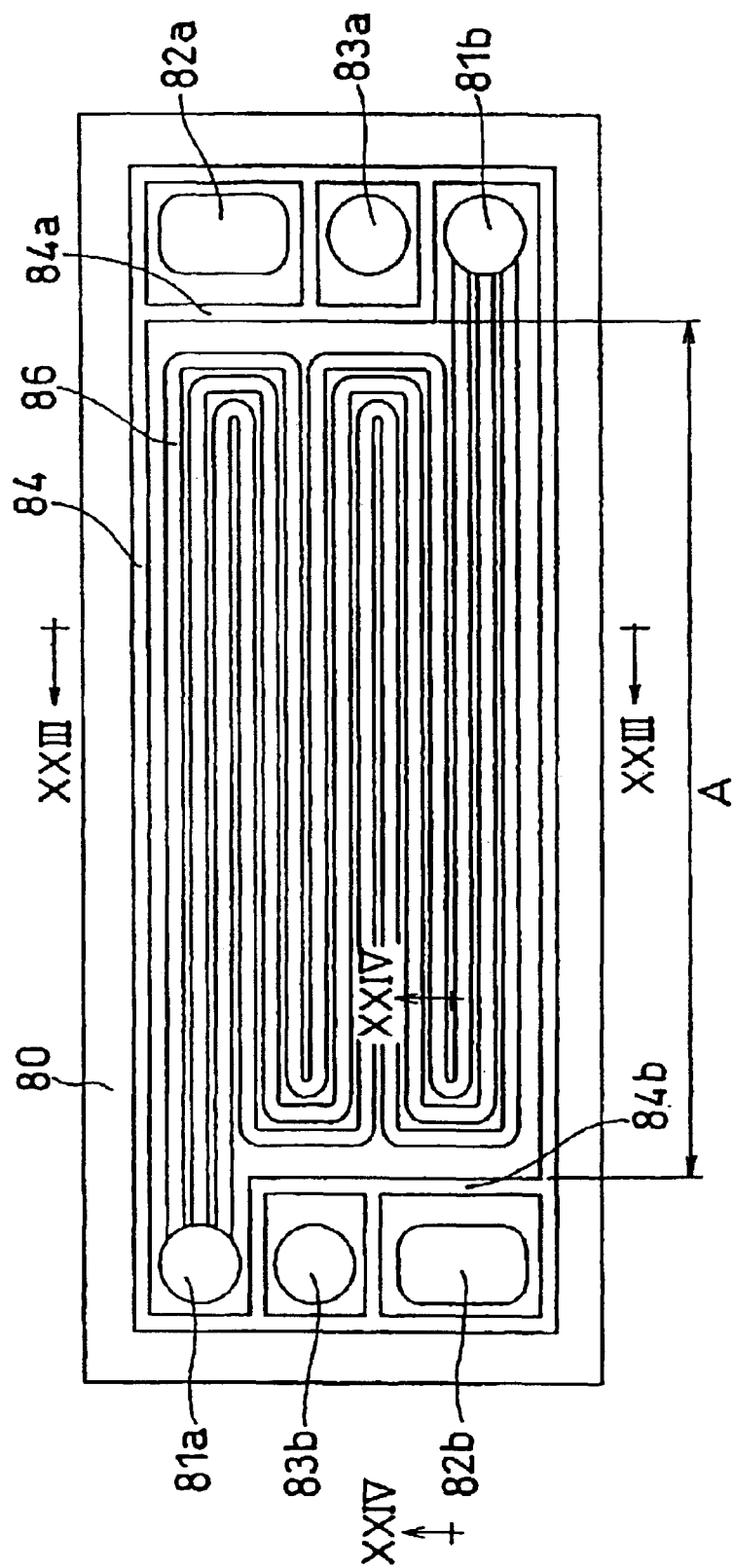
FIG. 21 is a front view of the anode side of a conductive separator plate used in the same example.
Figure 22:
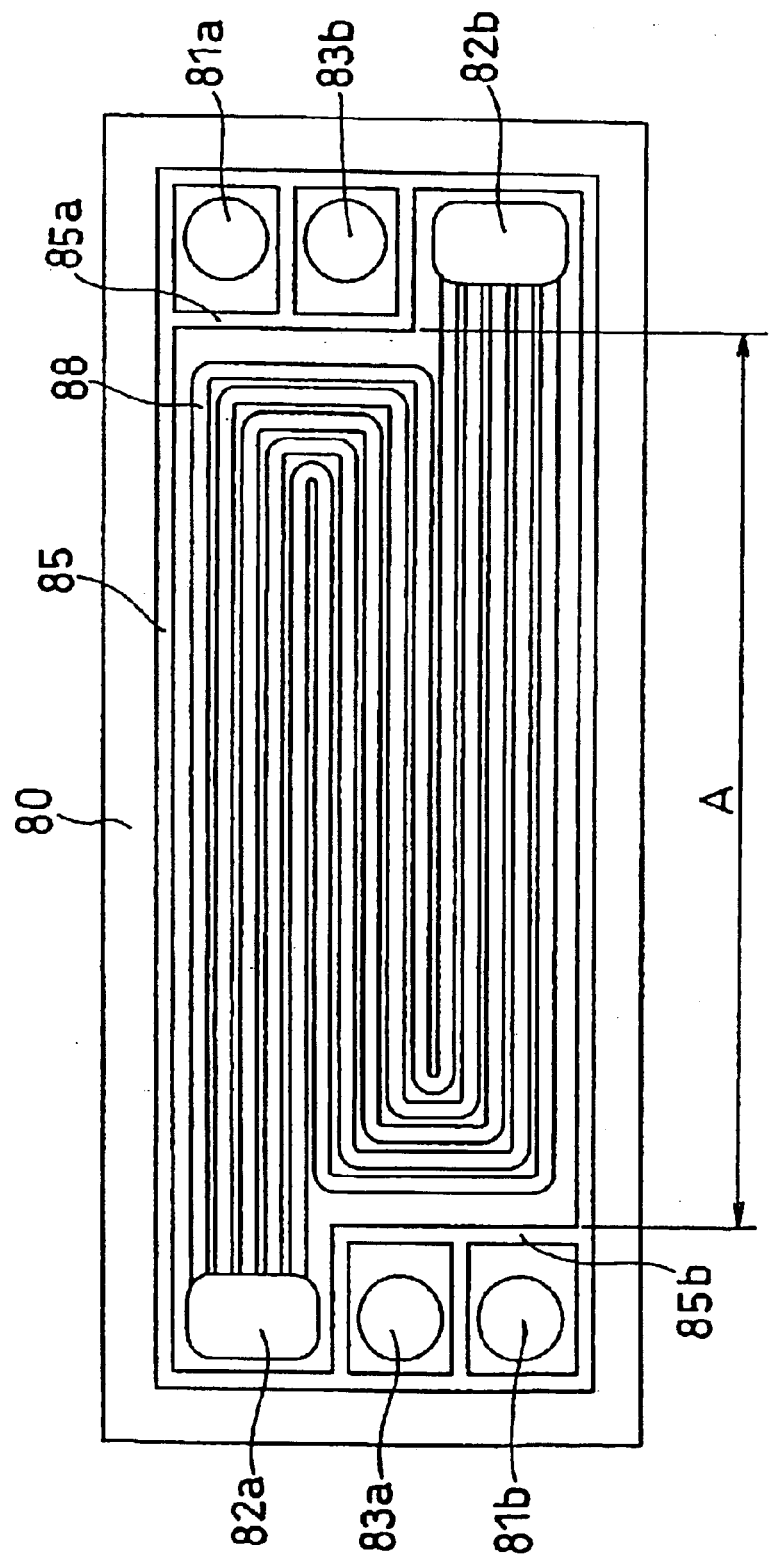
FIG. 22 is a rear view of the separator plate.
Figure 25:
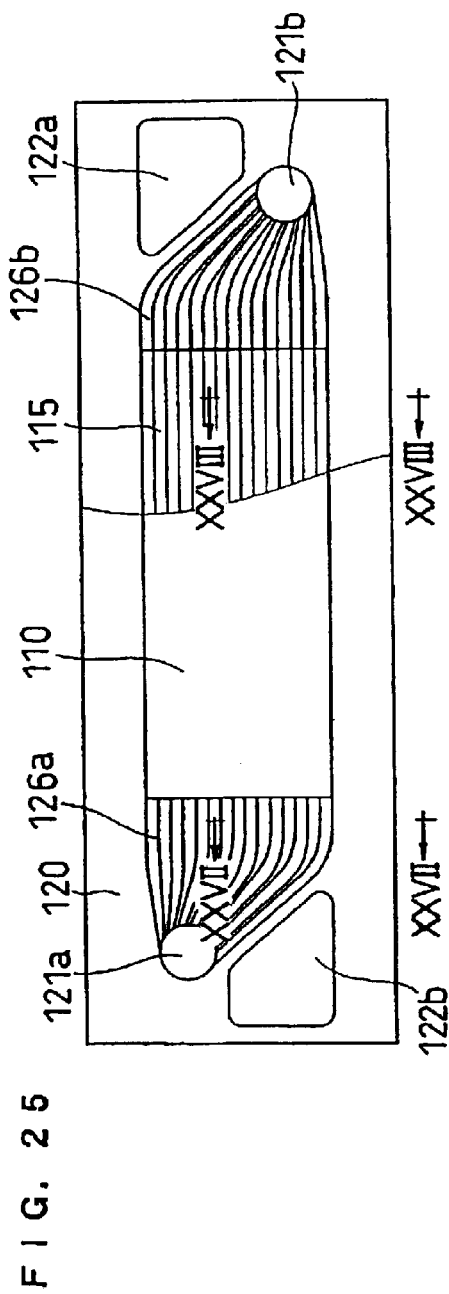
FIG. 25 is a partially broken front view of an MEA according to another example of the present invention.
Figure 26:
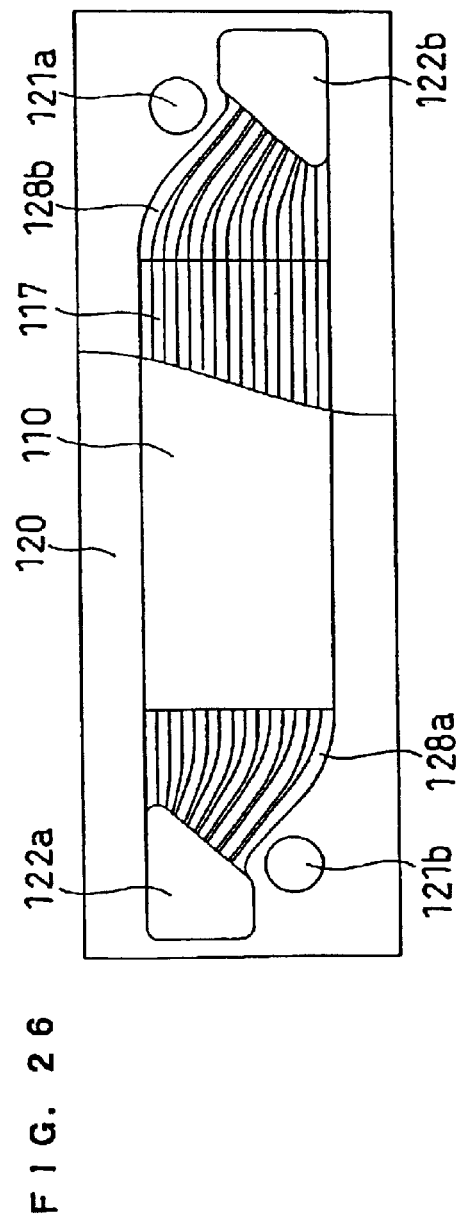
FIG. 26 is a rear view of the MEA.

FIGS. 18 through 20 illustrate an MEA of this embodiment, and FIGS. 21 through 23 show a conductive separator plate to be combined with this MEA. Like Embodiment 1, a gasket 60 is integrally joined to the peripheral portion of an electrolyte membrane 100 by injection molding. An anode 75 is joined to one surface of the electrolyte membrane 100 to which the gasket has been joined, while a cathode 77 is connected to the other surface thereof.

The gasket 60 has an inlet-side manifold aperture 61a and an outlet-side manifold apertures 61b for the fuel gas, an inlet-side manifold aperture 62a and an outlet-side manifold aperture 62b for the oxidant gas, and an inlet-side manifold aperture 63a and an outlet-side manifold aperture 63b for cooling water. The gasket 60 has, on the anode-side surface thereof, a rib 64 provided in the peripheral portion, and ribs 64a and 64b for separating the manifold apertures 62a, 63a and manifold apertures 62b, 63b from the anode 75. The rib 64 prevents the oxidant gas, fuel gas and cooling water from leaking out, while the ribs 64a and 64b prevent the oxidant gas, fuel gas and cooling water from mixing together. The gasket 60 has, on the cathode-surface thereof, a rib 65 provided in the peripheral portion, and ribs 65a and 65b for separating the manifold apertures 61a, 63b and manifold apertures 61b, 63a from the cathode 77.

A conductive separator plate 80 has manifold apertures 81a, 82a, 83a and 81b, 82b, 83b corresponding to the manifold apertures 61a, 62a, 63a and 61b, 62b, 63b of the gasket 60. The separator plate 80 has, on a surface thereof facing the anode, grooves 84, 84a and 84b into which the ribs 64, 64a and 64b are to be fitted respectively, while has, on a surface thereof facing the cathode, grooves 85, 85a and 85b into which the ribs 65, 65a and 65b are to be fitted, respectively.

Furthermore, the separator plate 80 has, on the surface thereof facing the anode, a gas flow channel 86 composed of three parallel grooves for guiding the fuel gas from the manifold aperture 81a to the manifold aperture 81b, while has, on the surface thereof facing the cathode, a gas flow channel 88 composed of five parallel grooves for guiding the oxidant gas from the manifold aperture 82a to the manifold aperture 82b. It is preferred that the center lines of the linear portions of the gas flow channels 86 and 88 extending in a longitudinal direction of the separator plate are aligned in agreement with each other on the front and rear surfaces as shown in FIG. 23.

FIG. 24 illustrates the structure of a cell stack comprising a combination of the MEA and the separator plate 80. In this example, a cooling section for passing the cooling water is provided for every two cells. This cooling section is composed of an anode-side separator plate 91 having the structure shown in FIG. 21 on a surface thereof facing the anode and a cooling water flow channel 94 on the rear face, and a cathode-side separator plate 92 having the structure shown in FIG. 22 on a surface thereof facing the cathode and a cooling water flow channel 96 on the rear face.

Next, the distance between the ribs, which are positioned between the cathode/anode and the fuel gas/oxidant gas inlet-side and outlet-side manifold apertures on the cathode- or anode-side surface of the gasket with the cathode/anode therebetween, is caused to slightly differ from the distance between the grooves in the conductive separator plate into which the ribs are to be fitted, and the significance thereof will be explained in the following. This will be explained in detail in later-described Example 3. The distance (dimension B) between the anode-side ribs 64a and 64b of the gasket 60 is slightly larger than the distance (dimension A) between the corresponding grooves 84a and 84b of the separator plate 80, and therefore the stronger the ribs 64a and 64b will be pressed against the outer side faces of the grooves 84a and 84b of the separator plate, the higher the leakage withstand pressure will become. Besides, the distance (dimension C) between the cathode-side ribs 65a and 65b of the gasket 60 is slightly smaller than the distance (dimension A) between the corresponding grooves 88a and 88b of the separator plate 80, and therefore the stronger the ribs 65a and 65b will be pressed against the inner side faces of the grooves 88a and 88b of the separator plate, the higher the leakage withstand pressure will become.

Embodiment 4

FIGS. 25 through 28 illustrate an MEA of this embodiment. Like Embodiment 1, a gasket 120 is integrally joined to the peripheral portion of an electrolyte membrane 110 by injection molding. The gasket 120 has gas flow channels 126a and 126b for connecting a gas flow channel 116 formed in the front surface of an anode 115 joined to the electrolyte membrane 110 to fuel gas inlet-side manifold aperture 121a and outlet-side manifold aperture 121b, respectively.

Furthermore, the gasket 120 has gas flow channels 128a and 128b for connecting a gas flow channel 118 formed in the front surface of a cathode 117 joined to the electrolyte membrane 110 to manifold apertures 122a and 122b, respectively. For the separator plate to be combined with this MEA, a metal plate in the form of a flat plate used in Embodiment 2 is used.

Embodiment 5

Figure 30:
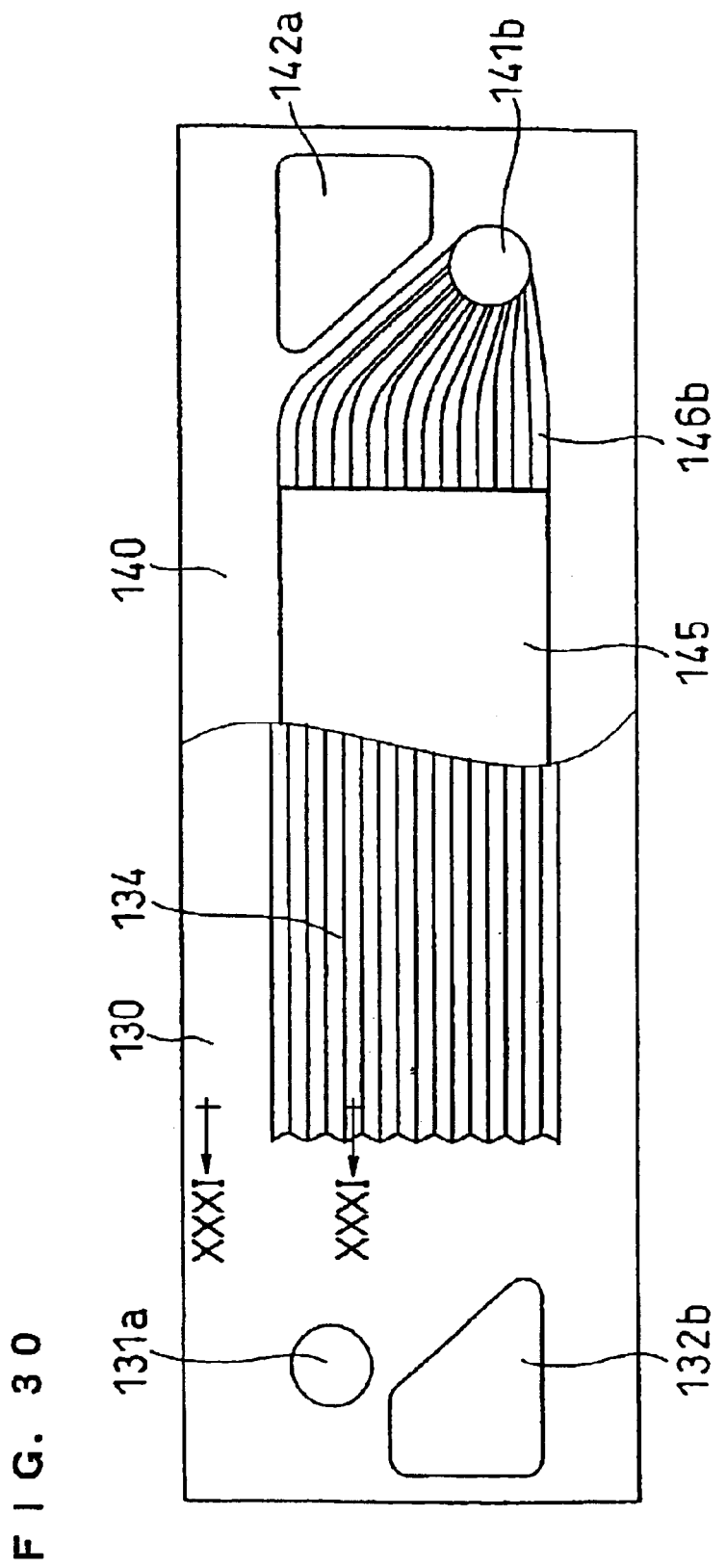
FIG. 30 is a partially broken front view of a cell stack using the same separator plate.
Figure 31:
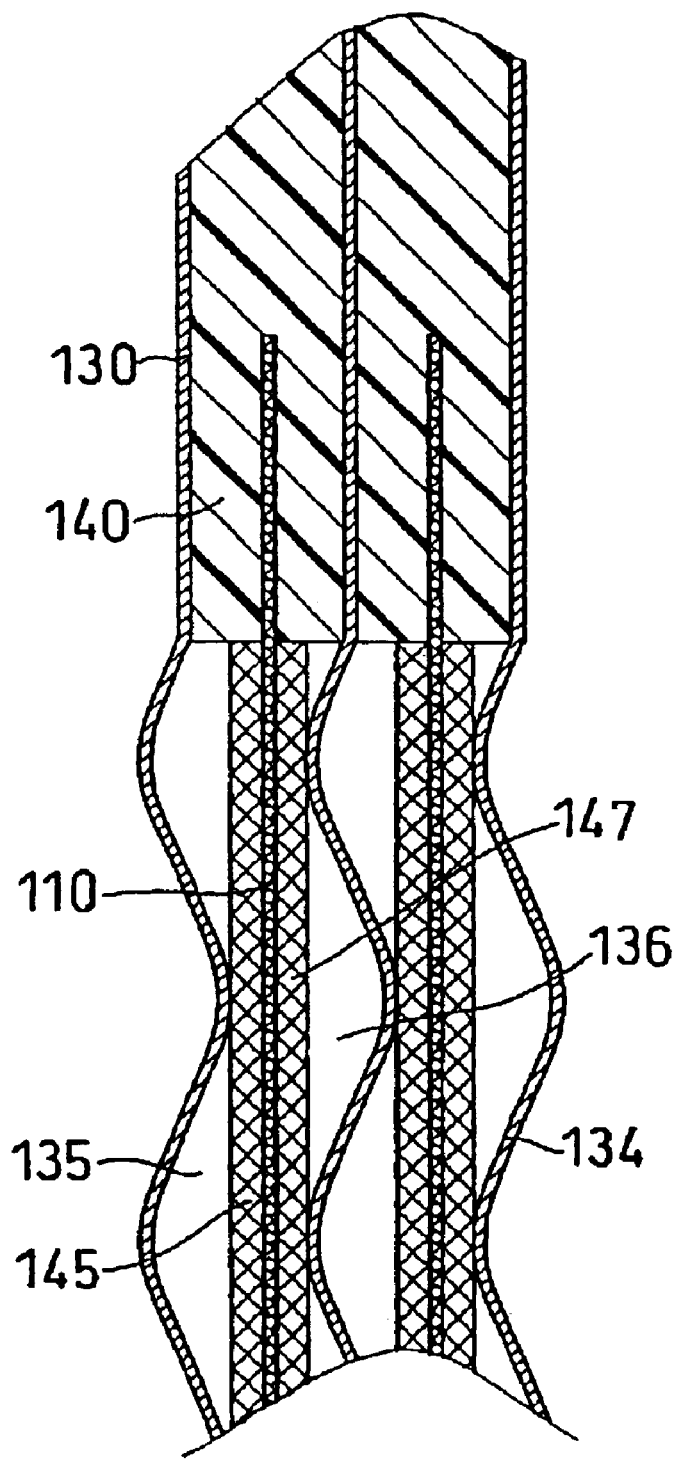
FIG. 31 is a cross sectional view cut along the XXXI—XXXI line of FIG. 30.
Figure 35:
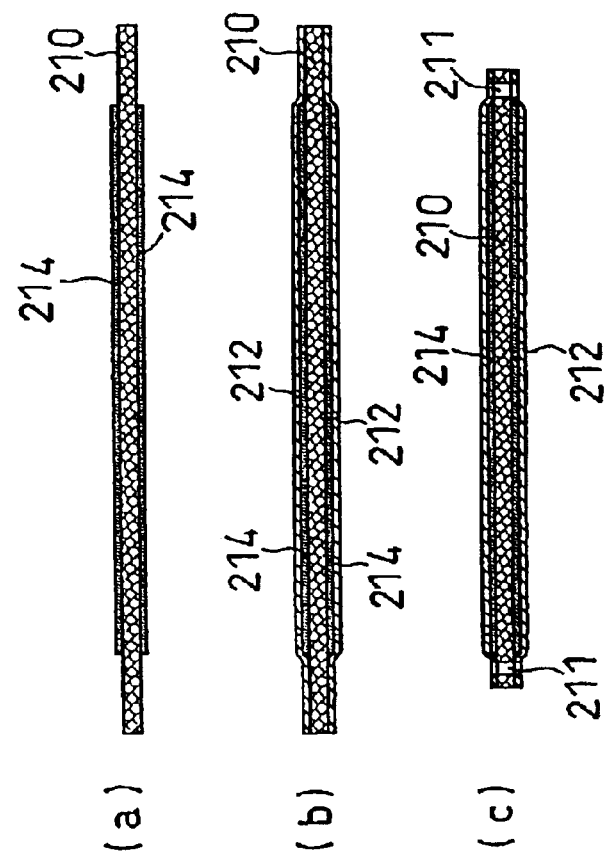
FIG. 35 is a cross sectional view showing the process of fabricating the same assembly.

FIG. 29 shows a separator plate of this embodiment, and FIGS. 30 and 31 illustrate a cell structure composed of a combination of this separator plate and an MEA.

A separator plate 130 is made of a metal plate, and a portion 134 forming a gas flow channel is molded in a corrugated or wavy form by press working. The separator plate 130 has an inlet-side manifold aperture 131a and an outlet-side manifold aperture 131b for the fuel gas, and an inlet-side manifold aperture 132a and an outlet-side manifold aperture 133b for the oxidant gas.

An anode 145 and a cathode 147 are joined to the exposed surfaces of the electrolyte membrane 110 having a gasket 140 integrally joined to the peripheral portion thereof by injection molding. This MEA and the separator plate 130 are alternately stacked to assemble a cell. Then, a fuel gas flow channel is formed between the anode 145 and the separator plate 130 by a recessed portion 135 of the corrugated section 134, and one end of this gas flow channel is connected to an outlet-side manifold aperture 141b through a gas flow channel 146b formed in the anode-side surface of the gasket 140. The other end of the gas flow channel formed by the recessed portion 135 is connected to the inlet-side manifold aperture through the gas flow channel formed in the anode-side surface of the gasket 140. Similarly, one end of an oxidant gas flow channel formed by the cathode 147 and a recessed portion 136 of the corrugated section 134 of the separator plate 130 is connected to an inlet-side manifold aperture 142a through a gas flow channel formed in the cathode-side surface of the gasket 140. The other end of the oxidant gas flow channel formed by the recessed portion 136 is connected to the outlet-side manifold aperture 142b through the gas flow channel formed in the cathode-side surface of the gasket 140.

The separator plate 130 can be fabricated by processing, for example, a JIS Class 1 titanium plate (0.1 mm in thickness) to have waves of a width of 3 mm, a pitch of 6 mm and a wave height of 0.6 mm (height on one side from the center line of the separator plate) by press working and then punching out manifold apertures with a press. By stacking the separator plates and the MEAs comprising a combination of plate-like electrodes, a cell comprising a thin cell and achieving a significantly improved output power density is obtained.

Furthermore, when a cell stack as shown in Embodiment 3 is to be constructed, it is necessary to provide manifold apertures for water in addition to those for the fuel gas and oxidant gas. Such a structure can also be obtained sufficiently by an appropriate design. In this case, the flow channel of the corrugated section can be used as it is as the water flow channel. In other words, suppose a section spanning from one separator plate for cooling to the next separator plate for cooling is one unit (one unit usually includes two to three pieces of MEA), by mutually shifting the waves of the separator plates of the adjacent units by a half pitch, it is possible to arrange the ridges of the separator plates of the adjacent units to come into contact with each other in the water flow channel, and consequently ensuring an electrical connection between the units.

In Embodiments 3, 4 and 5, while the positions of the manifold apertures for the oxidant gas and fuel gas are specified so that the oxidant gas and fuel gas are opposed flows, it is also possible to arrange the oxidant gas and fuel gas to flow in the same direction if necessary.

Embodiment 6

FIG. 32 shows an MEA according to this embodiment. Referring to FIGS. 33 through 37, the following description will explain a method for manufacturing this MEA.

First, as shown in FIG. 35(a), catalyst layers 214 are formed, respectively, on both the front and rear surfaces of a polymer electrolyte membrane 210, except for the peripheral portion thereof. One of the catalyst layers is an anode-side catalyst layer, while the other is a cathode-side catalyst layer. It is possible to change the compositions of both the catalyst layers if necessary. Next, as illustrated in FIG. 35(b), protective films 212 are superimposed to cover the catalyst layers 214 and the entire exposed surfaces of the electrolyte membrane. Subsequently, the resultant laminated product is punched out, thereby to cut into a predetermined size and form a plurality of through-holes 211 in the peripheral portion thereof. Consequently, as illustrated in FIG. 35(c), an assembly comprising the electrolyte membrane 210, catalyst layers 214 and protective films 212 is produced.

Figure 34:
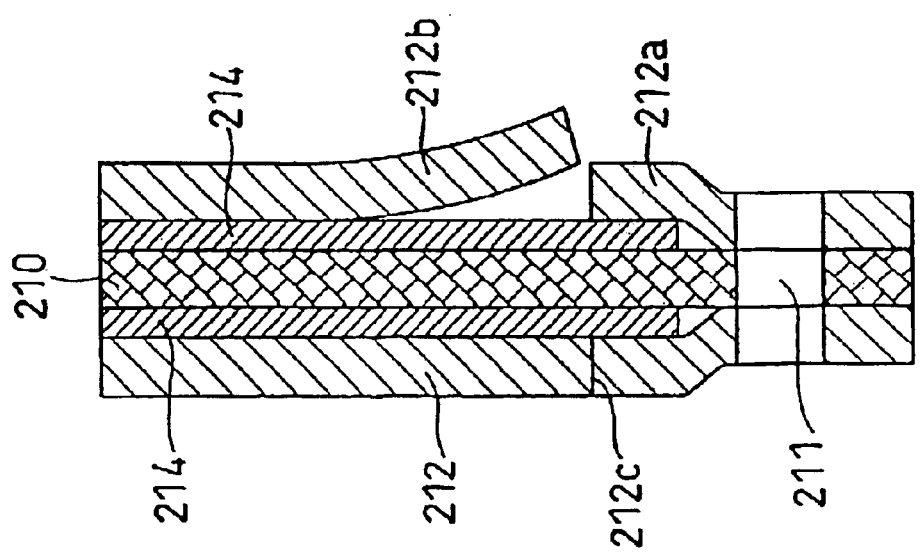
FIG. 34 is a cross sectional view cut along the W—W line of FIG. 33.
Figure 36:
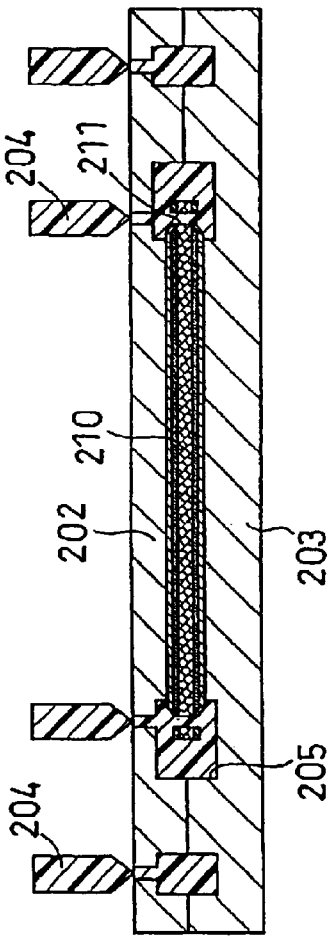
FIG. 36 is a cross sectional view of a mold for molding a gasket on the same assembly.
Figure 37:
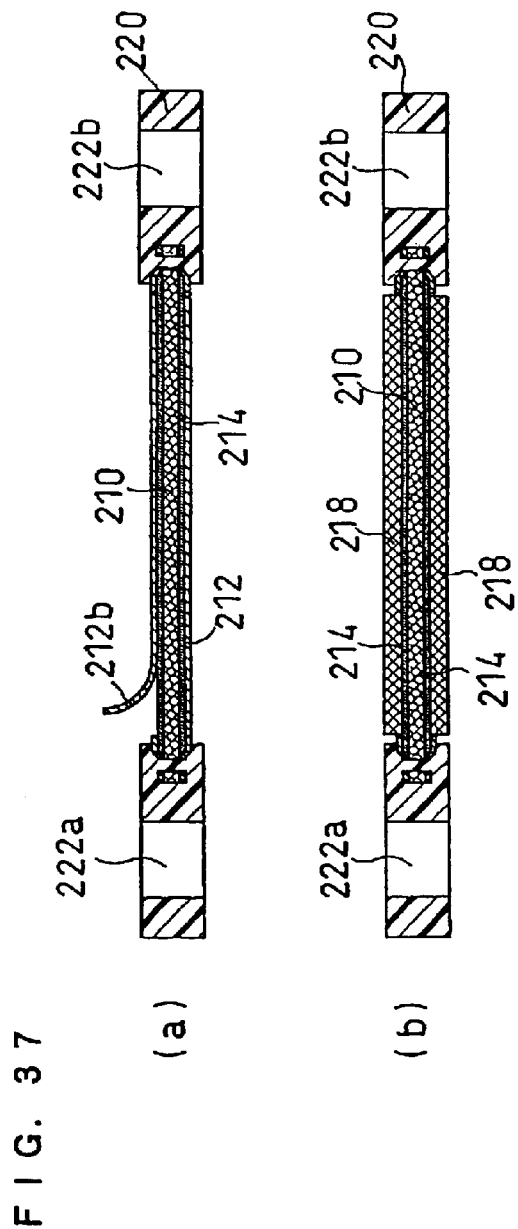
FIG. 37 is a cross sectional view showing the process of joining a diffusion layer to an assembly having the gasket molded thereon.
Figure 38:
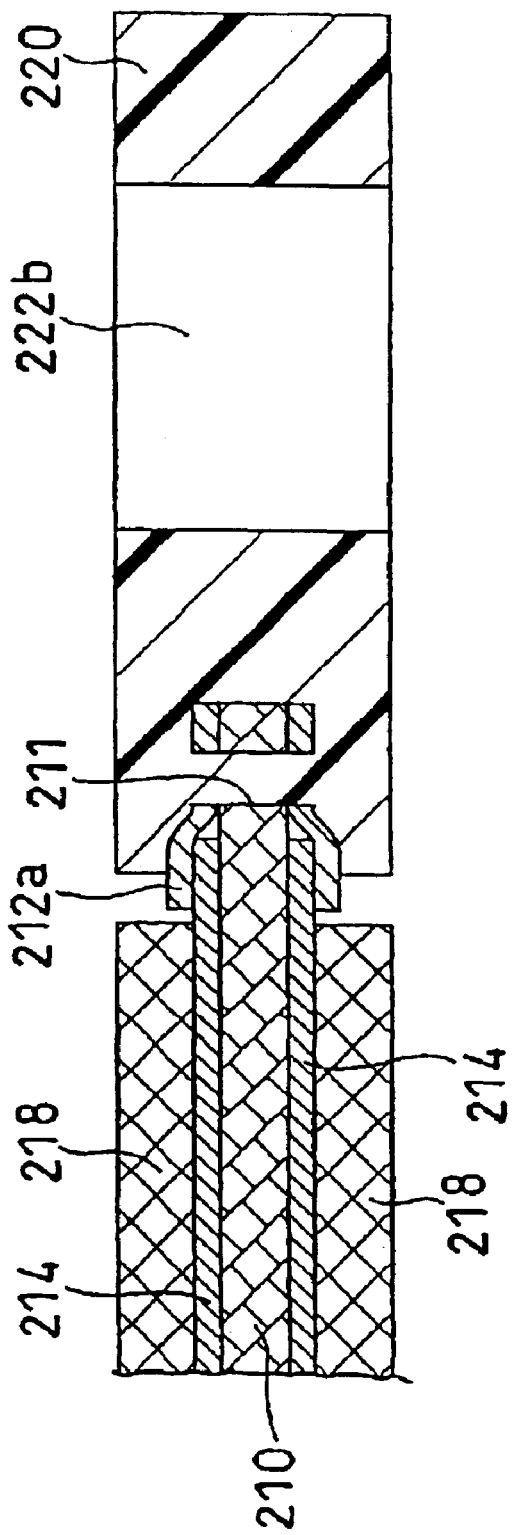
FIG. 38 is a cross sectional view cut along the Y—Y line of FIG. 32.

FIGS. 33 and 34 show this assembly. The protective film 212 has a cutting line 212c such as a perforated line which was formed in a predetermined position in advance. Next, this assembly is set in a mold shown in FIG. 36 so as to mold a gasket.

This mold is composed of a cavity mold 202 and a core mold 203, and a frame-like gasket 220 is molded on the peripheral portion of the assembly including the electrolyte membrane 210 by an insert injection molding process in which a melted thermoplastic resin or thermoplastic elastomer is poured into a molded product section 205 from gates 204.

The gasket 220 thus molded comprises a portion covering one surface of the assembly including the electrolyte membrane 210 and a portion covering the other surface thereof, which are connected to each other through the through-holes 211 arranged in the peripheral portion of the assembly. Moreover, the gasket 220 completely covers the outer circumference of the assembly. Therefore, the assembly including the electrolyte membrane 210 will never fall off from the gasket 220. Besides, gas leakage into a manifold aperture due to a detachment of the electrolyte membrane 210 from the gasket 220 will never occur. Normally, it is hard to expect the adhesiveness of the electrolyte membrane with respect to other resin material. However, according to the above-described structure, irrespective of the presence or absence of the adhesiveness, it is possible to completely prevent gas leakage due to a detachment of the electrolyte membrane from the gasket.

After molding the gasket 220 on the assembly of the electrolyte membrane 210 to which the catalyst layers 214 and the protective films 212 are joined as described above, a central portion 212b of each of the protective films 212 is cut off along the cutting line 212c so as to expose the catalyst layer 214. Next, a gas diffusion layer 218 is joined to the catalyst layer 214 by thermo-compression bonding. In this manner, an MEA as shown in FIG. 32 is produced. In this MEA, the protective films covering the peripheral portion of the electrolyte membrane 212 remain as indicated by 212a.

As shown in FIG. 32, the gasket 220 has an inlet-side manifold aperture 221a and outlet-side manifold aperture 221b for the fuel gas, and an inlet-side manifold aperture 222a and outlet-side manifold aperture 222b for the oxidant gas. These manifold apertures are provided-outside a portion of the gasket which covers the electrolyte membrane 210. In the example illustrated here, the gasket 220 has the manifold apertures for the fuel gas and oxidant gas, but has no manifold aperture for the cooling water. However, if necessary, the gasket can be provided with manifold apertures for the cooling water.

In the relation among the inside measurement of the gasket 220, the outer dimension of the catalyst layer 214 and the position of the through-holes 211, it is preferred that the catalyst layer 214 is larger than the inside measurement of the gasket 220 but does not reach the section of the through-holes 211. Since the formation of the through-holes in the catalyst layer section may cause a short circuit between the catalyst layers of both electrodes in this section, this must be avoided strictly. When the catalyst layer is smaller than the inside measurement of the gasket, a gap will be produced on an inserted part due to the presence or absence of the catalyst layer, and thus the smaller catalyst layer is not preferred from the aspect of optimizing the insert clearance (the distance between the mold halves when the mold is closed). In the aspect of molding, it is preferred that the peripheral portion of the catalyst layer 214 is covered up in the molded product section, namely a molding resin.

In a preferred embodiment of the present invention, a suitable material for the protective film 212 is a synthetic resin which is chemically inactive and meltable at a process temperature (usually 120 to 140° C.) for thermo-compression bonding the gas diffusion layer 218, for example, a polyethylene film. With the use of such a protective film, it is possible to produce an MEA having a structure in which a part of the protective film penetrates into the gas diffusion layer, i.e., a structure in which a part of the protective film is welded to the gas diffusion layer. As the material for such a protective film, it is possible to use an ethylene-vinyl acetate copolymer, etc., as well as polyethylene.

When such a protective film is used, at the time of molding the gasket, the molded product section of the protective film is melted once by heat of the molding resin, and then solidifies as the resin is cooled down. However, since the inner surface of the mold is always cooled, the perforated line section does not melt and the cut line of the perforated line is perfectly protected, and thus causing no trouble when detaching the protective film after removing the molded product. Thereafter, in the process of thermo-compression bonding the gas diffusion layer, the protective film melts, penetrates into pores in the gas diffusion layer, and solidifies when cooled down, thereby forming a penetrating portion 218a shown in FIG. 40. In other words, the protective film performs the function of protecting the polymer electrolyte membrane and the catalyst layer when molding the gasket, and functions as a hot-melt adhesive when thermo-compression bonding the diffusion layer. This technique has the advantage of preventing a detachment of the gas diffusion layer after the formation of the MEA and realizing significantly improved handling in the subsequent cell assembling steps.

Embodiment 7

The following description will explain another preferred embodiment of an electrolyte membrane-gasket assembly including protective films. In this embodiment, the size of a portion of the protective film to be cut off along the perforated line is smaller than the gas diffusion layer. Hence, the MEA can be constructed by using the remaining protective film for a bonding width and bonding the gas diffusion layer to the protective film.

In other words, according to this embodiment, it is possible to produce the MEA without hot-pressing the electrolyte membrane and electrodes together, which is essential for the conventional MEA production. It is thus possible to prevent damage of the MEA due to heat and pressure, and thermal deformation of the gasket in the manufacturing stage. As a method for bonding the remaining protective film and the gas diffusion layer together, an adhesive or an adhesive member such as a double sided adhesive tape may be used. While hot-pressing is conventionally an unavoidable step for the handling during the manufacture of the MEA, it is not an essential step for the cell function. The reasons for this are that the catalyst layer and the gas diffusion layer are in close contact with each other by sufficient clamping load, and their physical contact is kept during the cell operation.

Figure 41:
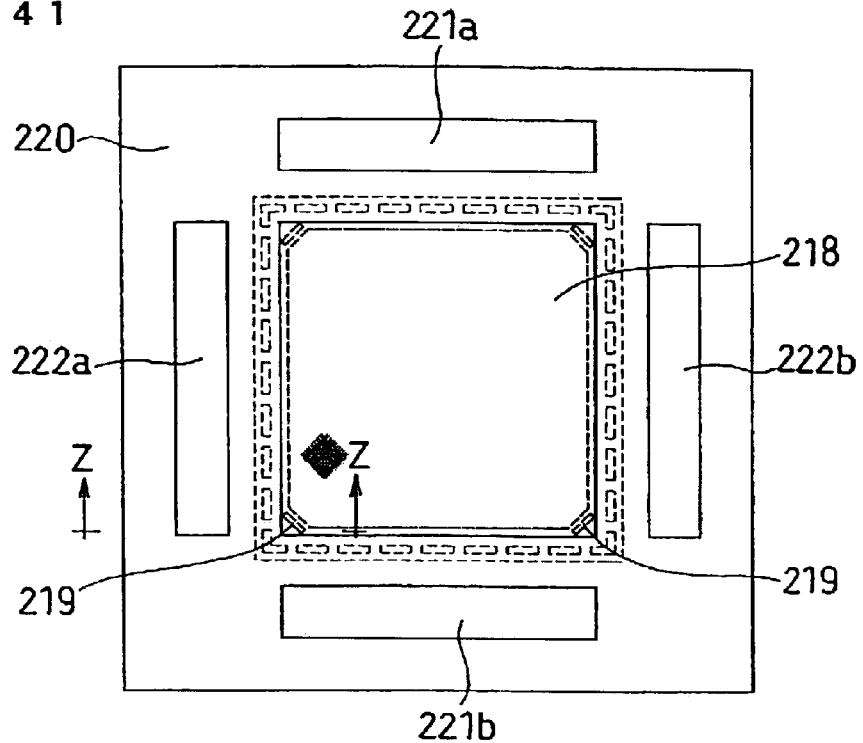
FIG. 41 is a front view of an MEA according to still another example.
Figure 42:
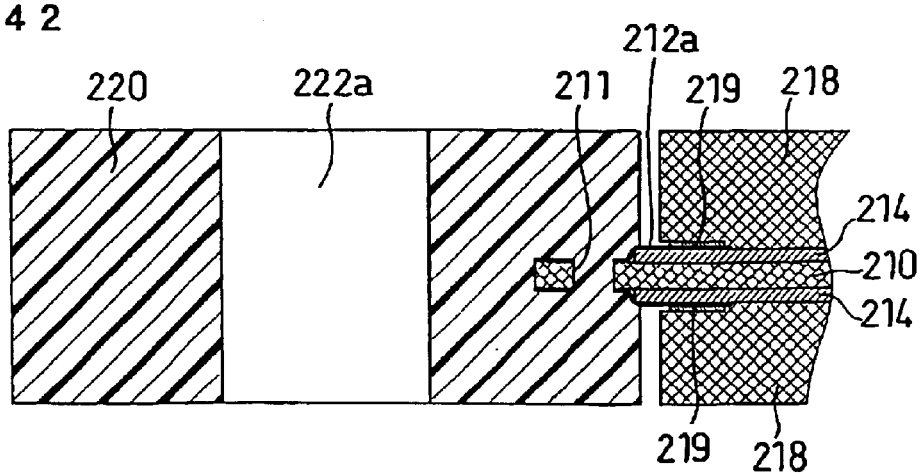
FIG. 42 is a cross sectional view cut along the Z—Z line of FIG. 41.
Figure 43:
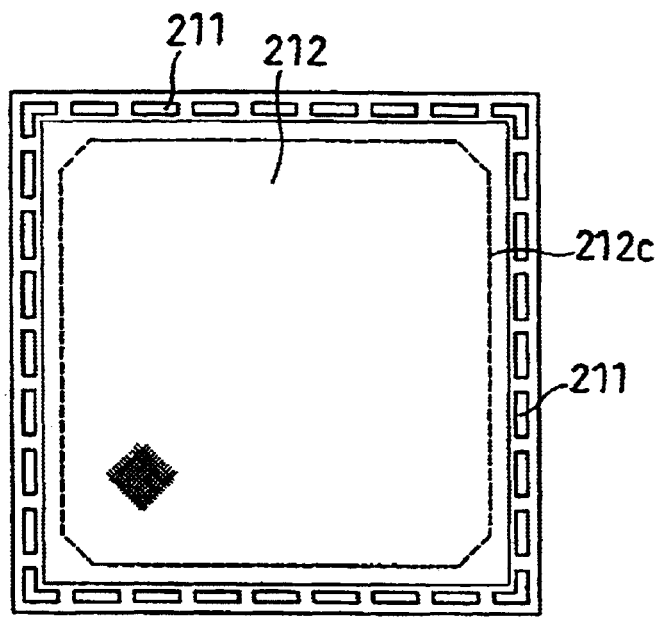
FIG. 43 is a front view of an assembly comprising the electrolyte membrane, catalyst layers and protective films of the MEA.

Referring to FIGS. 41, 42 and 43, this embodiment is explained.

FIG. 43 illustrates an assembly comprising the electrolyte membrane 210, catalyst layers 218 and protective films 212 similar to those shown in FIG. 32. This assembly has a sequence of through-holes 211 in the peripheral portion thereof, and the protective film 212 has a perforated line 212c. In the same manner as in Embodiment 6, the gasket 220 is molded on the peripheral portion of this assembly. The gasket 220 has manifold apertures 221a and 221b for the fuel gas, and manifold apertures 222a and 222b for the oxidant gas. After molding the gasket, the center portion of the protective film 212 is cut off along the perforated line 212c. The perforated line 212c is formed so that a remaining portion 212a of the protective film has a larger width in the four corners. By attaching a double sided adhesive tape 219 to the four corners of the remaining portion 212a of the protective film and superimposing the gas diffusion layer 218 on the catalyst layer 214 so that the peripheral portion comes into contact with the remaining portion 212a of the protective film, the gas diffusion layer 218 can be fixed to the remaining portion 212a of the protective film with the double sided adhesive tape 219.

A method for manufacturing an electrolyte membrane-gasket assembly shown in Embodiments 6 and 7 mentioned above comprises the steps of: forming catalyst layers on surfaces of a polymer electrolyte membrane; coating a protective film on each of the surfaces of the polymer electrolyte membrane on which the catalyst layers were formed; cutting the peripheral portion of the polymer electrolyte membrane and the protective films together into a predetermined size and forming a sequence of a plurality of through-holes piercing the protective films in the peripheral portion; and then injection-molding a seal material so as to form a gasket integrally on the peripheral portion, including the through-holes, of the polymer electrolyte membrane having the protective films. This method has the following advantages over a method in which the gasket is directly molded on the polymer electrolyte membrane having the through-holes in the peripheral portion.

According to the method in which the gasket is directly molded on the polymer electrolyte membrane, in order to physically protect the polymer electrolyte membrane when the mold is closed, the mold clearance (insert clearance) in the insert section needs to be at least equal to or more than the thickness of the polymer electrolyte membrane as the insert part. However, when this clearance is made larger, a melted resin injected from the gates flows into the insert part side (inner side) from the clearance and impairs the shape of the molded product. Therefore, the clearance must be made smaller than an amount calculated by adding to the thickness of the polymer electrolyte membrane a minimum flow width of the melted resin, i.e., a minimum clearance allowing the melted resin to pass through by the viscous resistance of the melted resin. The minimum flow width varies depending on the kinds of resins and molding conditions, and is five micron or less in the case of materials such as a liquid crystal polymer which are particularly suitable for molding thin articles. Hence, in the method in which the gasket is directly molded on the polymer electrolyte membrane, micron order accuracy is required for the insert clearance, and consequently extremely high mold work accuracy is required.

In addition, even after optimizing the insert clearance, only a several micron or several tens micron clearance is allowed for the clearance between the insert part and the mold, and therefore, if dust is caught at the time of clamping the mold, there arises a problem that a pinhole is produced in the polymer electrolyte membrane by the dust, and thus a working environment like the one for a semiconductor manufacturing factory is necessary.

Besides, when the gasket is molded on the polymer electrolyte membrane, in order to produce an MEA using the polymer electrolyte membrane-gasket assembly, the catalyst layer should be printed in a recessed portion enclosed by the gasket. Accordingly, the printing method is limited to a special method such as pad printing, and therefore general-purpose, highly productive techniques, such as screen printing, gravure printing and offset printing, can not be applied.

For this reason, a technique of forming the gasket by performing the step of printing the catalyst layer on the polymer electrolyte membrane as a pre-step is a reasonable process. However, if the catalyst layers are printed on the polymer electrolyte membrane, since the mold and the catalyst layers come into contact with each other, a loss of the catalyst will occur for some reasons such as adhesion of the catalyst layers to the mold or blowing off by a molding gas, and there would be further problems, such as breakdown or wear of the mold due to the catalyst dust, and corrosion of the mold by the catalyst.

According to the method shown in Embodiments 6 and 7, it is possible to solve all the above-mentioned problems associated with the method in which the gasket is directly molded on the polymer electrolyte membrane, i.e., a problem concerning the protection of the polymer electrolyte membrane and a matching problem between the process of molding the gasket and the process of printing the catalyst layer.

The following description will explain some examples of the present invention.

EXAMPLE 1

An electrolyte membrane-gasket assembly illustrated in FIGS. 3 through 6 was obtained by insert-molding a gasket 20 on a solid polymer electrolyte membrane 10 having through-holes 11 formed therein, with an insert molding machine as shown in FIG. 1. For the polymer electrolyte membrane, Nafion117 (50 µm in thickness) manufactured by E. I. du Pont de Nemours and Company was used, and it was punched out with a Thomson die cutter. The size of the membrane was 68 mm×68 mm, and through-holes with a width of 1.5 mm and a length of 6 mm were formed at a pitch of 8 mm in the peripheral portion. As a material for the gasket, a polyolefin-based thermoplastic elastomer (MILASTOMER M3800 manufactured by Mitsui Chemicals, Inc.) was used. The molding conditions were that the injection temperature was 235° C., the mold temperature was 50° C., the number of gates was 16 (pingate with φ of 0.9 mm), and the injection rate was 240 mm/second. By taking the resin molding shrinkage into account, the molded product section of the injection-molding mold was set larger than the molded product specified value by 15/1000. All the plane dimensions after the molding shrinkage of the molded gasket 20 were within a tolerance of +3/1000 with respect to the specified outer dimensions of 120 mm×120 mm, an electrode size (an exposed portion of the membrane) of 60 mm×60 mm, and a manifold aperture size of 10 mm×60 mm. The size of ribs 23a, 23b, 24a and 24b was 1.2 mm width×60 mm length×0.8 mm height, the mold draft was 3 degrees (common to both the anode side and the cathode side), and the reference thickness without the ribs was 0.7 mm. Moreover, at this time, since a portion of the polymer electrolyte membrane that takes part in a cell reaction was in close contact with the mold (50° C.), it was perfectly protected from the heat of the injected resin.

Note that even when a thermoplastic resin or a thermoplastic elastomer other than the above is used, it is possible to perform similar molding by using one in a grade with an appropriate melt flow rate and by optimizing the mold structure, molding dimensions, gate number, injection temperature, injection rate, etc.

Next, Ketjen Black EC (furnace black manufactured by Ketjen Black International Co.) having a specific surface area of 800 $m^2/g$ and DBP oil adsorption of 360 ml/100 g was caused to support platinum in a weight ratio of 1:1. 10 g of this catalyst powder was mixed with 35 g of water and 59 g of an alcohol dispersion of hydrogen ion conductive polymer electrolyte (9% FSS manufactured by Asahi Glass Co., Ltd.), and then the powder was dispersed using an ultrasonic agitator to produce a catalyst layer ink. This catalyst layer ink was coated on a polypropylene film (Torayfan 50-2500 manufactured by Toray Industries, Inc.), and dried to form a catalyst layer. The resultant catalyst layer was cut to a size of 59 mm×59 mm, and transferred to both surfaces of the exposed portion of the polymer electrolyte membrane of the molded product under the conditions of a temperature of 135° C. and a pressure of 3.2 MPa. Subsequently, an aqueous dispersion containing a polytetrafluoroethylene (PTFE) fine powder (manufactured by Daikin Industries, Ltd.) and acetylene black (manufactured by Denki Kagaku Kogyo K.K.) in a weight ratio of 1:4 was coated on one surface of a gas diffusion layer base material made of carbon fiber (TGPH 120 manufactured by Toray Industries, Inc.), and baked at 350° C. for 20 minutes to form a water-repellent layer having a density of 2.0 $mg/cm^2$ per unit area of the electrode.

An MEA was produced by hot-press joining (130° C. and 1.5 MPa) the water-repellent electrodes on which the water-repellent layers were formed to the electrolyte membrane to which the catalyst layers were transferred so that the water-repellent layers were in contact with the electrolyte membrane, and was then subjected to the following characteristic evaluation tests.

Next, a carbon separator plate having the configuration shown in FIGS. 7 through 9 was fabricated in the following manner. Manifold apertures (10×60 mm), flow channels for the air and fuel gas (with a groove width of 2.0 mm, a pitch of 3.0 mm and 15 paths on each of both surfaces), and grooves into which the gasket's ribs are to be fitted (with a groove width of 1.18 mm, a depth of 0.6 mm and a length of 60 mm at four positions on both surfaces) were formed in a resin-impregnated graphite plate (glassy carbon manufactured by Tokai Carbon Co. Ltd.) with outer dimensions of 120 mm×120 mm and a thickness of 3.0 mm by milling.

FIG. 10 shows a state in which the rib 24b of the gasket 20 is fitted into the groove 34b of the separator plate 30. The width of the groove was slightly narrower for the rib, but the rib was fitted into the groove of the separator plate because the rib was tapered and elastically deformable, and thus the gasket 20 was perfectly fixed to the separator plate 30 and hanging down of the gasket into the opposite gas flow channel that was mentioned in the conventional example did not occur.

Note that, when the height of the gasket's rib is low, for example, the mold draft can be small or is not necessary, and therefore, even if the groove of the separator plate is formed in a tapered shape instead of forming the rib in a tapered shape, or even if both the groove and the rib are formed in a tapered shape, it is needless to say that the same effect is obtainable by appropriately designing the draft and the groove (or rib) width.

Figure 44:
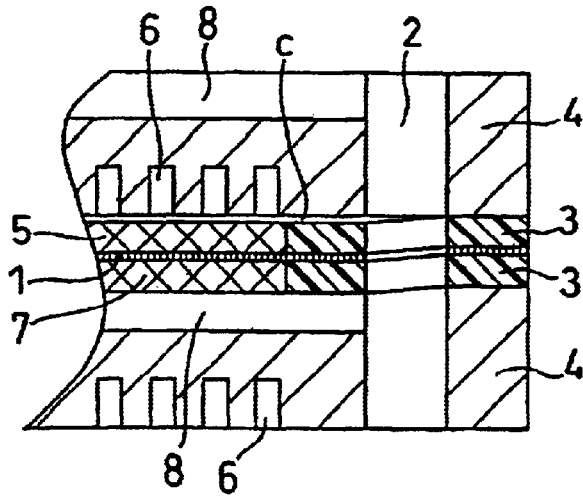
FIG. 44 is a cross sectional view of an essential part of a conventional MEA.
Figure 45:
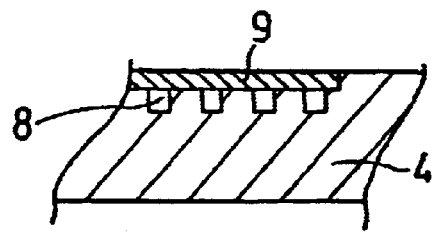
FIG. 45 is a cross sectional view of an essential part of a conductive separator plate of another conventional example.

Table 1 shows comparisons in the characteristics between a unit cell of the above-described example and Comparative Examples 1 and 2. Comparative Example 1 is a unit cell produced using a combination of the gasket and the separator plate shown in FIG. 44, while Comparative Example 2 is a unit cell produced using a combination of the same gasket and a separator plate having the bridge structure shown in FIG. 45. Each of the unit cells has the same specifications of the separator plate with regard to the outer dimensions, the manifold aperture size, the gas flow channel grooves, etc. as those of the separator plate of this example.

The evaluated items were as follows.
(1) Normal Cross Leak Test

A cross leak test which was carried out by clamping a unit cell at 1.5 MPa, keeping the pressure on the fuel electrode side at 50 kPa (test gas: nitrogen), and measuring the quantity of gas leaked from the air electrode side.
(2) Critical Cross-Leak Withstand Pressure Test A cross leak test which was carried out by clamping a unit cell at 1.5 MPa, increasing the fuel electrode pressure from zero, and observing a pressure at which gas leakage from the air electrode side was first observed.
(3) Cell Voltage in No Load Operation A cell voltage measured when a unit cell was operated at no load under the conditions of using humidified hydrogen (65° C. dew point) and humidified air (65° C. dew point) as the fuel gas and the oxidant gas, respectively, and keeping the cell temperature at 75° C.
(4) Cell Voltage in Normal Load Operation A cell voltage measured when a unit cell was operated at a fuel utilization ratio of 70%, an air utilization ratio of 50% and an output current density of 200 $mA/cm^2$ per unit area of the electrode under the conditions of using humidified hydrogen (65° C. dew point) and humidified air (65° C. dew point) as the fuel gas and the oxidant gas, respectively, and keeping the cell temperature at 75° C.

TABLE 1

| Sample | Normal cross leak test (ml/min) | Critical cross-leak withstand pressure test (kPa) | No load voltage (mV) | Normal load voltage (mV) |
| --- | --- | --- | --- | --- |
| Example 1 | 332 | 2.3 | 945 | 735 |
| Comparative Example 1 | 95 | 6.7 | 965 | 751 |
| Comparative Example 2 | Measurable limit or less | 225 | 1010 | 789 |

It is clear from the results shown in Table 1 that the gasket/separator plate fitting structure of the present invention enabled a significant reduction in the gas cross leakage compared to the conventional examples, and consequently improvements were also observed in the cell characteristics. Moreover, in consideration of the usually used supplied gas pressure for polymer electrolyte fuel cells, a critical differential pressure of 225 kPa is considered as being a sufficient value even when a sudden unbalance in the quantity of the supplied gases occurs due to a change in load. For a cell for use in an automobile, the supplied gas pressure is around 200 kPa, and the fuel gas/air differential pressure is usually not more than about one fifth or so of this pressure.

EXAMPLE 2

Using a technique similar to Example 1, a gasket having the shape shown in FIGS. 11 through 13 was insert-molded to be joined to the peripheral portion of the electrolyte membrane. The outer dimensions of the gasket 40 were 120 mm×120 mm, and gas flow channels 45a, 45b, 46a and 46b with a groove width of 2 mm, a pitch of 3 mm and a depth of 0.6 mm were formed on both surfaces so that the overall thickness was 1.9 mm with respect to a reference thickness of 0.7 mm. The same polymer electrolyte membrane and the molding conditions as in Example 1 were used.

Next, an electrode base material with a gas flow channel was fabricated using the technique explained in FIGS. 16 and 17. In other words, after cutting the semi-finished products of 90 μm thick carbon fiber gas diffusion base materials (TGPH prepreg and carbon fiber paper before graphitized, manufactured by Toray Industries, Inc.) into an appropriate size, only positioning holes were punched out in one kind, and positioning holes and slits for forming a gas flow channel were punched out in another one kind. While performing positioning using a binder of aqueous solution of carboxymethyl cellulose (CMC), four sheets of the former one kind were bonded together and seven sheets of the later one kind were bonded to the four-sheet stack, and then the resultant product was heat-treated at 2400° C. for 10 minutes in an inert gas to fabricate a single electrode base material having an overall thickness of 0.95 mm, a reference thickness of 0.35 mm and a gas flow channel depth of 0.6 mm. Subsequently, like Embodiment 1, a catalyst layer was transferred to an exposed portion of the polymer electrolyte membrane. Thereafter, a water-repellent layer was formed on the flat side of the electrode base material by a technique similar to Example 1, and was joined to the electrolyte membrane by hot-pressing so that the water-repellent layer was positioned on the electrolyte membrane side, thereby producing an MEA.

Next, a separator plate was fabricated using the following technique. After punching out manifold apertures in a JIS Class 1 titanium plate (manufactured by Kobe Steel Ltd., 0.1 mm in thickness, annealed) with a press, the plate was boiled with 5% aqueous ammonia to remove organic materials adhering to the surfaces thereof. Subsequently, this plate was boiled in 3% aqueous solution of hydrogen peroxide to oxidize the surfaces, dipped in a hydrofluoric acid buffer solution (obtained by mixing 3 parts by volume of ammonium fluoride to one part by volume of hydrofluoric acid and diluting the mixture to 1/10 with water) for one minute to remove the surface oxide films, and then washed with pure water. Then, the plate was immediately moved into a diffusion furnace in which a carrier gas (nitrogen) had been flowing, and then thermal nitriding was carried out for one hour by mixing ammonia with the carrier gas so that the ammonia concentration became 2000 ppm and raising the temperature to 900° C. With the above-described technique, a 0.1 mm thick titanium separator plate with a 280 nm thick titanium nitride layer on each of both surfaces was fabricated.

A unit cell having the structure shown in FIGS. 14 and 15 was fabricated by combining the MEA and the separator plate. The cell thickness (the pitch between the separator plates) when the cell was not clamped was 2.0 mm (1.90 mm+0.1), and thus reduced to about a half of the cell thickness, 3.7 mm, of Example 1. Since the cell thicknesses when these cells were clamped were 1.7 mm and 3.6 mm, respectively, this example achieved an output power density about two times the conventional density.

The characteristics were evaluated using a technique similar to Example 1, and Table 2 shows the results. The cell of this example has characteristics substantially as good as those of Example 1, and it is clear that these characteristics are superior to those of the conventional examples.

TABLE 2

| Sample | Normal cross leak test (ml/min) | Critical cross-leak withstand pressure test (kPa) | No load voltage (mV) | Normal load voltage (mV) |
|---|---|---|---|---|
| Example 2 | Measurable limit or less | 112 | 1005 | 780 |
| Example 1 | Measurable limit or less | 225 | 1010 | 789 |

EXAMPLE 3

A cell stack according to Embodiment 3 was constructed.

For the separator plates, manifold apertures, gas flow channels, and gasket-rib fitting grooves 84, 84a, 84b, 85, 85a and 85b were formed in resin-impregnated graphite plates having outer dimensions of 320×130 mm×2.0 mm (thickness) by sand blasting. The gas flow channel for the fuel gas had a groove width of 4 mm, a pitch of 6 mm and a depth of 0.6 mm and was in the form of three-path serpentine, while the gas flow channel for the air had a groove width of 4 mm, a pitch of 6 mm and a depth of 0.7 mm and was in the form of five-path serpentine. The gasket-rib fitting groove had a width of 1.78±0.02 mm and a depth of 0.66 mm (over the entire circumference). Both of the anode-side and cathode-side separator plates had the gasket fitting grooves of the same inner dimension (dimension A in FIG. 21 and FIG. 22). Moreover, the anode-side specification and cathode-side specification of the anode-side separator plate and cathode-side separator plate having a cooling water flow channel in the rear surface thereof are the same as those of the above-mentioned separator plates.

Subsequently, using the same technique as in Example 1, an MEA having an electrode area of 210 mm×90 mm shown in FIGS. 18 through 20 was produced. The rib of the gasket to be fitted into the groove of the separator plate had a width of 1.8±0.01 mm, a height of 0.6 mm, and a draft of 3 degrees. At this time, three kinds of products were produced by setting the above-mentioned dimension A, the dimension B between the anode-side ribs 64a and 64b of the gasket 60, and the dimension C between the cathode-side ribs 65a and 65b in accordance with Specifications 1 through 3 shown in Table 3.

TABLE 3

| Specification | Dimension A (mm) | Dimension B (mm) | Dimension C (mm) |
|---|---|---|---|
| Specification 1 | 216.0 ± 0.05 | 216.0 ± 0.05 | 216.0 ± 0.05 |
| Specification 2 | 216.0 ± 0.05 | 216.05 ± 0.05 | 215.95 ± 0.05 |
| Specification 3 | 216.0 ± 0.05 | 216.10 ± 0.05 | 215.90 ± 0.05 |

In other words, dimensions A through C were all the same in Specification 1, but, in Specifications 2 and 3, the inner dimension of the anode-side rib of the gasket was set slightly larger than the dimension A, while the inner dimension of the cathode-side rib was set slightly smaller than the dimension A. These specifications give structures in which the anode-side ribs of the gasket are always in contact with the outer side faces of the grooves of the separator plate, while the cathode-side ribs are always in contact with the inner side faces of the grooves of the separator plate. The characteristics of cell stacks obtained by stacking 40 cells comprising the separator plates and the MEAs of Specifications 1 through 3 were evaluated under the same conditions as in Example 1. The results are shown in Table 4. Note that, the normal cross leak test and the critical cross leak test show the total values of the 40 cells, while the no load cell voltage and the normal load cell voltage show average values of the 40 cells. Moreover, the comparative example has the same separator plates and electrode size as those mentioned above, but both of the separator plates and gasket have no fitting section.

TABLE 4

| Specification | Normal cross leak test (ml/min) | Critical cross-leak withstand pressure test (kPa) | No load voltage (mV) | Normal load voltage (mV) |
| --- | --- | --- | --- | --- |
| Specification 1 | Measurable limit or less | 165 | 1008 | 788 |
| Specification 2 | Measurable limit or less | 233 | 1010 | 788 |
| Specification 3 | Measurable limit or less | 284 | 1010 | 789 |
| Comparative Example | 4820 | 2.21 | 942 | 738 |

It is clear from Table 4 that, in Specifications 1 through 3, the stronger the anode-side ribs of the gasket will be pressed against the outer side faces of the grooves of the separator plate, the higher the cross-leak withstand pressure will become, and it would be appreciated that this mechanism is the same as the functioning mechanism of an O ring and the leak path is closed by the pressure of the leaking gas. Furthermore, it was confirmed that all the specifications had much better characteristics compared to the comparative example. Besides, even when the gasket was arranged to have the same distance between the ribs on both surfaces and, instead of changing the distance between the ribs, the distance between the grooves of the separator plates fitting the ribs were changed, the same effects as above were obtained.

EXAMPLE 4

A fuel cell according to Embodiment 4 was constructed using the same technique as in Example 2. The outer dimensions of the gasket and separator plate were 230×75 mm. Both of the gas flow channels of the fuel electrode and air electrode had a length of 108 mm, a width of 3 mm, a pitch of 6 mm, and a depth of 0.6 mm. Moreover, the gasket had a groove with a depth of 0.6 mm on both surfaces thereof, and an overall thickness of 1.9 mm with respect to a reference thickness of 0.7 mm. The cell thickness, i.e., the distance between the center of the separator plates was 2.0 mm, and an output power density about two times the density of the conventional example was obtained. In addition, if the flowing directions of gases are made opposite, this cell can also be used as an opposed flow type cell.

Besides, the cross-leak withstand pressure and other characteristics were substantially the same as those shown in Table 2 of Example 2. In particular, the reason why a sufficient cross-leak withstand pressure was obtained without the fitting relation between the ribs of the gasket and the grooves of the separator plates should be considered as follows. That is, the cause of gas cross leakage in the conventional fuel cell structure is a hanging down of the gasket into the gas flow channel groove provided in the separator plate. On the other hand, the cause of the corresponding gas cross leakage in the fuel cell of this example is a hanging down of the separator plate into the flow channel groove provided in the gasket, but since the separator plate is a metal plate and is very hard to deform as compared to the gasket, the separator plate would hardly hang down.

EXAMPLE 5

Ketjen Black EC (furnace black manufactured by Ketjen Black International Co.) having a specific surface area of 800 $m^2$/g and DBP oil adsorption of 360 ml/100 g was caused to support platinum in a weight ratio of 1:1. 10 g of this catalyst powder was mixed with 35 g of water and 59 g of an alcohol dispersion of hydrogen ion conductive polymer electrolyte (9% FSS manufactured by Asahi Glass Co., Ltd.), and then the powder was dispersed using an ultrasonic agitator to produce a catalyst layer ink. This catalyst layer ink was coated on a polypropylene film (Torayfan 50-2500 manufactured by Toray Industries, Inc.), and dried to form a catalyst layer. The resultant catalyst layer was cut to a size of 62 mm×62 mm, and transferred to both surfaces of a polymer electrolyte membrane (50 $\mu$m thick Nafion117 manufactured by E. I. du Pont de Nemours and Company) under the conditions of a temperature of 135° C. and a pressure of 3.2 MPa to form a 10 $\mu$m thick catalyst layer on each of the both surfaces.

Subsequently, a perforated line was formed to draw a 56×56 mm square on a 25 $\mu$m thick polyethylene terephthalate (hereinafter referred to as PET) film (Lumirror #2551 manufactured by Toray Industries Inc.), with a perforating Thomson die cutter produced using a micro perforating blade (saw blade) with a pitch of 80 $\mu$m. Thereafter, the polymer electrolyte membrane with the catalyst layers and the PET films with the perforated line were placed one upon another while positioning them, and then through-holes and the outline were punched out with a Thomson die cutter so as to produce an insert part with the overall size of 68 mm×68 mm and a number of through-holes (1.5 mm in width and 3.0 mm in length), composed of an assembly comprising the polymer electrolyte membrane, catalyst layers and protective films in the structure shown in FIG. 33.

Next, with the use of a polyolefin-based thermoplastic elastomer (MILASTOMER M3800 manufactured by Mitsui Chemicals, Inc.), a gasket was insert-molded with respect to the insert part, under the conditions that the injection temperature was 235° C., the mold temperature was 50° C., the number of gates was 16 (pinpoint gates with a diameter of 0.9 mm) and the injection rate was 240 mm/second. The gasket has a configuration as shown in FIG. 32 with the outer dimensions of 120×120 mm, inner dimensions of 60×60 mm, four 10×60 mm manifold apertures for the fuel gas and oxidant gas, and a thickness of 700±20 $\mu$m. Then, the molded product was nipped with a special vacuum suction jig, connected to a vacuum exhaust system having a simple on-off mechanism composed of a combination of a timer and an electromagnetic valve, and then the center portion inside the perforated line of the protective film was detached along the perforated ling momentarily (0.2 to 0.4 seconds) by vacuum sucking.

Figure 39:
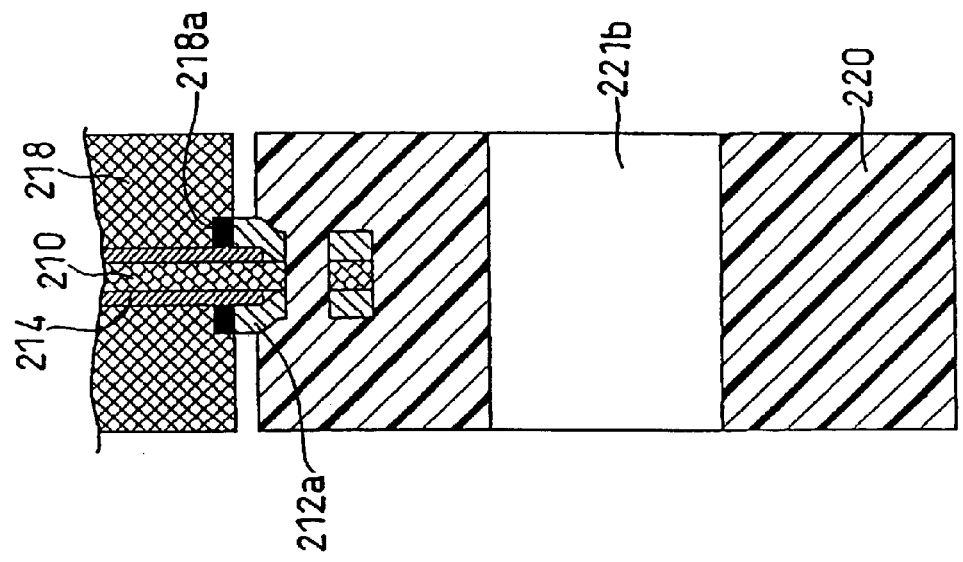
FIG. 39 is a cross sectional view of an essential part of an MEA according to another example.

Subsequently, an aqueous dispersion containing a polytetrafluoroethylene (PTFE) fine powder (manufactured by Daikin Industries, Ltd.) and acetylene black (manufactured by Denki Kagaku Kogyo K.K.) in a weight ratio of 1:4 was coated on one surface of a gas diffusion layer made of carbon fiber (TGPH 120 manufactured by Toray Industries, Inc.), and baked at 350° C. for 20 minutes to form a 40 $\mu$m thick water-repellent layer. This layer was die-cut to a size of 59×59 mm. Thereafter, the gas diffusion layer on which the water-repellent layer was formed was joined by hot pressing (130° C., 1.5 MPa) to a surface of the molded product where the catalyst layer was exposed so that the water-repellent layer was in contact with the catalyst layer, and consequently an MEA shown in FIG. 32 and FIG. 39 was produced.

COMPARATIVE EXAMPLE 3

First, a polymer electrolyte membrane was punched out with the Thomson die cutter to form through-holes in the peripheral portion thereof, and a gasket was insert-molded to integrate with the polymer electrolyte membrane. Next, after transferring a catalyst layer to the exposed portion of the polymer electrolyte membrane, a gas diffusion layer having a water repellent layer was bonded by thermo-compressing bonding to produce an MEA. All the polymer electrolyte membrane, the catalyst layer forming method, the method for manufacturing the gas diffusion layer having the water-repellent layer, and the thermo-compression bonding conditions during the production of the MEA, were the same as those in Example 5.

Table 5 and Table 6 show the data of initial product defects of Comparative Example 3 and Example 5 when the gasket was insert-molded with five kinds of insert clearances.

Here, a pinhole inspection is an inspection performed by assembling a cell after forming the MEA and operating the cell to evaluate whether the no-load voltage reaches a reference value (960 mV), and, if the polymer electrolyte membrane has a pinhole, the voltage does not reach the reference value. An appearance inspection is an inspection performed to find if there are burrs that may cause a trouble when assembling an MEA, in the inside measurement of the gasket, i.e., a section where the gas diffusion layer is to be fitted. The number of samples was 1000 each, the defect ratio in the respective tests is indicated in percentage in the A and B rows, and also the yield (100%-A-B) is shown.

TABLE 5

| | Insert clearance | 45 ± 3 $\mu$m | 50 ± 3 $\mu$m | 55 ± 3 $\mu$m | 60 ± 3 $\mu$m |
|---|---|---|---|---|---|
| A | Pinhole inspection | 98% | 92% | 82% | 65% |
| B | Appearance inspection (burr in the inner circumference) | 0% | 3% | 9% | 16% |
| | Yield (100-A-B) | 2% | 5% | 9% | 19% |

TABLE 6

| | Insert clearance | 110 ± 3 $\mu$m | 115 ± 3 $\mu$m | 120 ± 3 $\mu$m | 125 ± 3 $\mu$m |
|---|---|---|---|---|---|
| A | Pinhole inspection | 2% | 0% | 0% | 0% |
| B | Appearance inspection (burr in the inner circumference) | 0% | 0% | 0% | 3% |
| | Yield (100-A-B) | 98% | 100% | 100% | 97% |

It is clear from Tables 5 and 6 that, in Comparative Example 3, particularly, there is a problem of membrane breakup due to the direct contact of the mold with the polymer electrolyte membrane, and when the insert clearance was increased to avoid this problem, an appearance defect occurred, resulting in a low yield. On the other hand, in Example 5, even when the insert clearance was decreased to avoid an appearance defect, since the polymer electrolyte membrane was protected from the mold and the tolerance of the insert clearance determined by the yield was as wide as 112 (115−3 $\mu$m) to 123 (120+3 $\mu$m), the conventional strict requirement for the mold work accuracy was eased.

EXAMPLE 6

An electrolyte membrane-gasket assembly including catalyst layers joined to an electrolyte membrane and protective films covering the peripheral portions of the catalyst layers was obtained using the same technique as in Example 5, except that the size of the perforated line of the protective film was made 56×56 mm and the four corners were chamfered by 4.0 mm as shown in FIG. 41.

Meanwhile, a gas diffusion layer having a water-repellent layer similar to Example 5 was prepared, and bonded to the four corners of the protective film with a double sided adhesive tape for fixing electronic parts (#5516 manufactured by Sekisui Chemical Co., Ltd.) to produce an MEA.

In order to compare the characteristics of this MEA and the MEA of Example 5, fuel cells were constructed by inserting each of the MEAs between separator plates having the configurations shown in FIG. 7 and FIG. 8 (but having no ribs 33a, 33b and ribs 34a, 34b) so that the electrode surface pressure was 0.7 MPa. Then, humidified pure hydrogen and humidified air (the bubbler temperature was 60° C.) were supplied to the anode and the cathode, respectively, and a cell test was conducted by keeping the cell temperature at 75° C. and setting the fuel gas utilization ratio to 70% and the air utilization ratio to 40%. As a result, it was confirmed that there was no difference between the characteristics of these cells.

EXAMPLE 7

Figure 40:
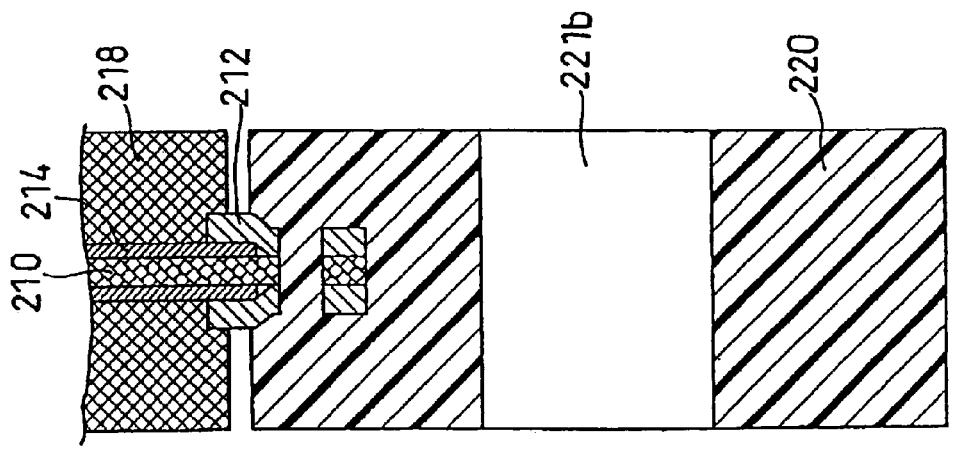
FIG. 40 is a cross sectional view of an essential part of an MEA according to still another example.

By using a 25 $\mu$m thick polyethylene film (HUZ-25 manufactured by Tohcello Co., Ltd.) in place of the PET film used as the protective film in Example 5, an MEA was produced using the same technique as in Example 5. In this case, since the mold temperature (50° C.) when molding the gasket was lower than the melting temperature (120° C.) of the polyethylene film, the perforated line was protected, and detachment was easily carried out. Moreover, after joining the gas diffusion layer by hot pressing, the MEA was cut to observe the cross section thereof, and it was confirmed that a part of the protective film penetrated into the gas diffusion layer as shown in FIG. 40. At this time, the detachment strength of the diffusion layer was three to four times higher than that of the MEA produced in Example 5, and thus it was confirmed that the protective film functioned as a hot melt adhesive.

In this embodiment, since the gas diffusion layer is joined to the gasket through the penetrating layer and the protective film, there is the advantage that the once formed MEA can be handled without being decomposed during the assembling process, the replacement process of a defective cell and other process, and consequently giving the advantage of facilitating the adoption of an automatic assembling process and contributing greatly to an improvement in the productivity.

INDUSTRIAL APPLICABILITY

As clear from the above, according to the present invention, it is possible to provide a polymer electrolyte fuel cell that is free from gas cross leakage caused by a detachment of the gasket from the polymer electrolyte membrane. The present invention can also significantly increase the yield of the injection molding technique of the gasket and solve the complication of processes in a series of the MEA manufacturing flows, thereby contributing to an improvement in the productivity and a reduction in the process cost.

What is claimed is:

1. A polymer electrolyte fuel cell, comprising:
   an electrolyte membrane-electrode assembly including a polymer electrolyte membrane whose peripheral portion is covered with a gasket made of a seal material, an anode joined to one surface of said electrolyte membrane, and a cathode joined to the other surface of said electrolyte membrane;
   an anode-side conductive separator plate and a cathode-side conductive separator plate, sandwiching said electrolyte membrane-electrode assembly therebetween; and
   gas supply means for supplying a fuel gas and an oxidant gas to said anode and said cathode, respectively,
   wherein said electrolyte membrane has a sequence of a plurality of through-holes in the peripheral portion thereof, and a portion of said gasket covering one surface of said electrolyte membrane and a portion covering the other surface thereof are connected to each other through the through-holes of said electrolyte membrane.

2. The polymer electrolyte fuel cell in accordance with claim 1, wherein said gasket has ribs on surfaces thereof facing said anode-side conductive separator plate and cathode-side conductive separator plate, respectively, and said ribs are fitted into grooves provided in said anode-side conductive separator plate and cathode-side conductive separator plate, respectively.

3. The polymer electrolyte fuel cell in accordance with claim 1,
   wherein said gas supply means comprises, for each of a fuel gas and an oxidant gas, inlet-side and outlet-side manifold apertures piercing said anode-side conductive separator plate, cathode-side conductive separator plate and gasket,
   said gasket has ribs on a surface thereof facing said anode-side conductive separator plate, at positions separating said oxidant gas manifold apertures from said anode, and ribs on a surface thereof facing said cathode-side conductive separator plate, at positions separating said fuel gas manifold apertures from said cathode, and
   said ribs are fitted into grooves provided in said anode-side conductive separator plate and cathode-side conductive separator plate, respectively.

4. The polymer electrolyte fuel cell in accordance with claim 3,
   wherein said ribs on the cathode-side surface of said gasket are positioned between said cathode and said fuel gas inlet-side and outlet-side manifold apertures, respectively, with said cathode therebetween, a distance between said ribs slightly differs from a distance between the grooves provided in said conductive separator plate for fitting said ribs, and outer circumferential portions of said ribs are in contact externally with the grooves, or inner circumferential portions of said ribs are in contact internally with the grooves.

5. The polymer electrolyte fuel cell in accordance with claim 1,
   wherein said gas supply means comprises, for each of a fuel gas and an oxidant gas, inlet-side and outlet-side manifold apertures piercing said anode-side conductive separator plate, cathode-side conductive separator plate and gasket,
   said anode and cathode have flow channels for the fuel gas and the oxidant gas, respectively, on the surfaces thereof which do not face said electrolyte membrane, and
   said gasket has gas flow channels for connecting said oxidant gas manifold apertures and the gas flow channel of said cathode, on a surface thereof facing said cathode-side conductive separator plate, and gas flow channels for connecting said fuel gas manifold apertures and the gas flow channel of said anode, on a surface thereof facing said anode-side conductive separator plate.

6. The polymer electrolyte fuel cell in accordance with claim 1,
   wherein said gas supply means comprises, for each of a fuel gas and an oxidant gas, inlet-side and outlet-side manifold apertures piercing said anode-side conductive separator plate, cathode-side conductive separator plate and gasket,
   said anode-side conductive separator plate and cathode-side conductive separator plate have flow channels for the fuel gas and the oxidant gas, respectively, on the surfaces thereof facing said anode and said cathode, respectively, and
   said gasket has gas flow channels for connecting said oxidant gas manifold apertures and the gas flow channel of said cathode-side conductive separator plate, on a surface thereof facing said cathode-side conductive separator plate, and gas flow channels for connecting said fuel gas manifold apertures and the gas flow channel of said anode-side conductive separator plate, on a surface thereof facing said anode-side conductive separator plate.

7. The polymer electrolyte fuel cell in accordance with claim 1, wherein said gasket is made of a thermoplastic resin or a thermoplastic elastomer.

8. A polymer electrolyte fuel cell, comprising:
   an electrolyte membrane-electrode assembly including a polymer electrolyte membrane, catalyst layers carried on both surfaces of said polymer electrolyte membrane, respectively, protective films covering, respectively, sections spanning from a peripheral portion of each of said catalyst layers to a peripheral portion of said polymer electrolyte membrane, a gasket, made of a seal material, covering sections spanning from a peripheral portion of each of said protective films to a peripheral edge of said polymer electrolyte membrane, and gas diffusion layers joined to said catalyst layers to construct an anode and a cathode, respectively;

an anode-side conductive separator plate and a cathode-side conductive separator plate, sandwiching said electrolyte membrane-electrode assembly therebetween; and gas supply means for supplying a fuel gas and an oxidant gas to said anode and said cathode, respectively, wherein said polymer electrolyte membrane and said protective films have a sequence of a plurality of piercing through-holes in the peripheral portions thereof, and a portion of said gasket covering one side of said polymer electrolyte membrane and a portion covering the other side thereof are connected to each other through said through-holes.

9. The polymer electrolyte fuel cell in accordance with claim 8, wherein the peripheral portion of said catalyst layer is covered up in said gasket with said protective film therebetween and is not connected to said through-holes.

10. The polymer electrolyte fuel cell in accordance with claim 8, wherein a part of said protective film physically penetrates into a part of said gas diffusion layer.

11. The polymer electrolyte fuel cell in accordance with claim 8, wherein said gas diffusion layer is bonded to said protective film with an adhesive or a double sided adhesive tape.

12. The polymer electrolyte fuel cell in accordance with claim 8, wherein said gasket has ribs on surfaces thereof facing said anode-side conductive separator plate and cathode-side conductive separator plate, respectively, and said ribs are fitted into grooves provided in said anode-side conductive separator plate and cathode-side conductive separator plate, respectively.

13. The polymer electrolyte fuel cell in accordance with claim 8, wherein said gas supply means comprises, for each of a fuel gas and an oxidant gas, inlet-side and outlet-side manifold apertures piercing said anode-side conductive separator plate, cathode-side conductive separator plate and gasket, said gasket has ribs on a surface thereof facing said anode-side conductive separator plate, at positions separating said oxidant gas manifold apertures from said anode, and ribs on a surface thereof facing said cathode-side conductive separator plate, at positions separating said fuel gas manifold apertures from said cathode, and said ribs are fitted into grooves provided in said anode-side conductive separator plate and cathode-side conductive separator plate, respectively.

14. The polymer electrolyte fuel cell in accordance with claim 13, wherein said ribs on the cathode-side surface of said gasket are positioned between said cathode and said fuel gas inlet-side and outlet-side manifold apertures with said cathode therebetween, a distance between said ribs slightly differs from a distance between the grooves provided in said conductive separator plate for fitting said ribs, and outer side faces of said ribs are in contact with the outer side faces of said grooves, or inner side faces of said ribs are in contact with the inner side faces of said grooves.

15. The polymer electrolyte fuel cell in accordance with claim 8, wherein said gas supply means comprises, for each of a fuel gas and an oxidant gas, inlet-side and outlet-side manifold apertures piercing said anode-side conductive separator plate, cathode-side conductive separator plate and gasket, said anode and cathode have flow channels for the fuel gas and the oxidant gas, respectively, on the surfaces thereof which do not face said electrolyte membrane, and said gasket has gas flow channels for connecting said oxidant gas manifold apertures and the gas flow channel of said cathode, on a surface thereof facing said cathode-side conductive separator plate, and gas flow channels for connecting said fuel gas manifold apertures and the gas flow channel of said anode, on a surface thereof facing said anode-side conductive separator plate.

16. The polymer electrolyte fuel cell in accordance with claim 8, wherein said gas supply means comprises, for each of a fuel gas and an oxidant gas, inlet-side and outlet-side manifold apertures piercing said anode-side conductive separator plate, cathode-side conductive separator plate and gasket, said anode-side conductive separator plate and cathode-side conductive separator plate have flow channels for the fuel gas and the oxidant gas, respectively, on the surfaces thereof facing said anode and said cathode, respectively, and said gasket has gas flow channels for connecting said oxidant gas manifold apertures and the gas flow channel of said cathode-side conductive separator plate, on a surface thereof facing said cathode-side conductive separator plate, and gas flow channels for connecting said fuel gas manifold apertures and the gas flow channel of said anode-side conductive separator plate, on a surface thereof facing said anode-side conductive separator plate.

17. The polymer electrolyte fuel cell in accordance with claim 8, wherein said gasket is made of a thermoplastic resin or a thermoplastic elastomer.

18. A method for manufacturing a polymer electrolyte fuel cell comprising the steps of:

forming catalyst layers on both surfaces of a polymer electrolyte membrane, respectively, except for a peripheral portion thereof;

coating a protective film on each of both surfaces of said polymer electrolyte membrane on which said catalyst layers were formed;

cutting the peripheral portion of said polymer electrolyte membrane and said protective films together into a predetermined size and forming a sequence of a plurality of through-holes piercing the peripheral portion;

injection-molding a seal material so as to form a gasket integrally on the peripheral portion, including said through-holes, of said polymer electrolyte membrane having said protective films; and detaching said protective films from said catalyst layers while leaving the peripheral portions thereof.

19. The method for manufacturing a polymer electrolyte fuel cell in accordance with claim 18, wherein said protective film is provided in advance with a cutting line for specifying a portion to be detached.

20. The method for manufacturing a polymer electrolyte fuel cell in accordance with claim 18, comprising the step of joining a gas diffusion layer to an exposed portion of said catalyst layer from which said protective film was detached.

21. The method for manufacturing a polymer electrolyte fuel cell in accordance with claim 20, further comprising the step of causing a part of said protective film to penetrate into said gas diffusion layer by thermo-compression bonding said gas diffusion layer to said protective film.

22. The method for manufacturing a polymer electrolyte fuel cell in accordance with claim 20, further comprising the step of bonding said gas diffusion layer to said protective film with an adhesive or a double sided adhesive tape.

23. An electrolyte membrane-gasket assembly for a fuel cell, comprising a polymer electrolyte membrane, and a gasket, made of a seal material, covering a peripheral portion of said electrolyte membrane,
wherein said electrolyte membrane-gasket assembly includes catalyst layers carried on both surfaces of said polymer electrolyte membrane, respectively, and protective films covering, respectively, sections spanning from a peripheral portion of each of said catalyst layers to the peripheral portion of said polymer electrolyte membrane,
said gasket covers sections spanning from a peripheral portion of each of said protective films to a peripheral edge of said polymer electrolyte membrane,
said polymer electrolyte membrane and protective films have a sequence of a plurality of piercing through-holes in the peripheral portions thereof, and
a portion of said gasket covering one side of said polymer electrolyte membrane and a portion covering the other side thereof are connected to each other through said through-holes.

24. The electrolyte membrane-gasket assembly for a fuel cell in accordance with claim 23, wherein the peripheral portion of said catalyst layer is covered up in said gasket with said protective film therebetween and is not connected to said through-holes.

25. The electrolyte membrane-gasket assembly for a fuel cell in accordance with claim 23, wherein said gasket includes inlet-side and outlet-side manifold apertures for each of a fuel gas and an oxidant gas, and has, on one surface thereof, gas flow channels for supplying the fuel gas to an anode formed on an exposed surface of said catalyst layer from the fuel gas inlet-side manifold aperture and for exhausting the gas from said anode to the fuel gas outlet-side manifold aperture, and has, on the other surface thereof, gas flow channels for supplying the oxidant gas to a cathode formed on an exposed surface of said catalyst layer from the oxidant gas inlet-side manifold aperture and for exhausting the gas from said cathode to the oxidant gas outlet-side manifold aperture.

26. The electrolyte membrane-gasket assembly for a fuel cell in accordance with claim 23, wherein said gasket is made of a thermoplastic resin or a thermoplastic elastomer.

27. The electrolyte membrane-gasket assembly for a fuel cell in accordance with claim 23, further comprising gas diffusion layers in contact with the exposed portions of said catalyst layers, respectively, wherein a peripheral portion of each of said gas diffusion layers is welded to said protective film.

28. The electrolyte membrane-gasket assembly for a fuel cell in accordance with claim 23, further comprising gas diffusion layers in contact with the exposed portions of said catalyst layers, respectively, wherein a peripheral portion of each of said gas diffusion layers is bonded to said protective film.

29. An electrolyte membrane-gasket assembly for a fuel cell, comprising a polymer electrolyte membrane, and a gasket, made of a seal material, covering a peripheral portion of said electrolyte membrane,
wherein said electrolyte membrane-gasket assembly includes catalyst layers carried on both surfaces of said polymer electrolyte membrane, respectively, and protective films covering entire surfaces of said catalyst layers and the peripheral portion of said polymer electrolyte membrane,
said gasket covers sections spanning from a peripheral portion of each of said protective films to a peripheral edge of said polymer electrolyte membrane,
said polymer electrolyte membrane and protective films have a sequence of a plurality of piercing through-holes in the peripheral portions thereof, and
a portion of said gasket covering one side of said polymer electrolyte membrane and a portion covering the other side thereof are connected to each other through said through-holes.

30. The electrolyte membrane-gasket assembly for a fuel cell in accordance with claim 29, wherein said protective film has a cutting line, in the peripheral portion thereof, for cutting off a major part covering said catalyst layer.

31. A method for manufacturing an electrolyte membrane-gasket assembly for a fuel cell, comprising the steps of:
forming catalyst layers on both surfaces of a polymer electrolyte membrane, respectively, except for a peripheral portion thereof;
coating a protective film on each of both surfaces of said polymer electrolyte membrane on which said catalyst layers were formed;
cutting the peripheral portion of said polymer electrolyte membrane and said protective films together into a predetermined size and forming a sequence of a plurality of through-holes piercing the peripheral portion; and
injection-molding a seal material so as to form a gasket integrally on the peripheral portion, including said through-holes, of said polymer electrolyte membrane having said protective films.

* * * * *